(12) United States Patent
Cho et al.

(10) Patent No.: US 11,829,641 B2
(45) Date of Patent: Nov. 28, 2023

(54) STORAGE DEVICE AND OPERATING METHOD FOR MANAGING A COMMAND QUEUE

(71) Applicant: Samsung Electronics Co., Ltd., Suwon-si (KR)

(72) Inventors: Jeongjae Cho, Suwon-si (KR); Myunghyun Jo, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 100 days.

(21) Appl. No.: 17/516,955

(22) Filed: Nov. 2, 2021

(65) Prior Publication Data

US 2022/0188033 A1    Jun. 16, 2022

(30) Foreign Application Priority Data

Dec. 10, 2020  (KR) .......................... 10-2020-0172573

(51) Int. Cl.
  *G06F 3/06*  (2006.01)
(52) U.S. Cl.
  CPC .......... *G06F 3/0659* (2013.01); *G06F 3/0604* (2013.01); *G06F 3/0679* (2013.01)
(58) Field of Classification Search
  CPC .... G06F 3/0604; G06F 3/0659; G06F 3/0679; G06F 3/061; G06F 3/0611; G06F 3/0613; G06F 3/0655; G06F 3/0658
  See application file for complete search history.

(56) References Cited

U.S. PATENT DOCUMENTS

| | | | |
|---|---|---|---|
| 7,362,702 B2 | 4/2008 | Terrell et al. | |
| 8,825,927 B2 | 9/2014 | Mayhew et al. | |
| 9,838,321 B2 | 12/2017 | Contavalli | |
| 10,620,996 B2 | 4/2020 | Tucker et al. | |
| 2007/0083662 A1* | 4/2007 | Adams .................. | H04L 5/0053 707/999.001 |
| 2009/0064153 A1* | 3/2009 | Ishimura ............... | G06F 9/5011 712/E9.034 |
| 2010/0082855 A1* | 4/2010 | Accapadi .............. | G06F 13/364 710/39 |
| 2016/0299689 A1* | 10/2016 | Kim ....................... | G06F 3/0688 |
| 2016/0337257 A1 | 11/2016 | Yifrach et al. | |
| 2017/0293586 A1 | 10/2017 | Yan et al. | |
| 2018/0088974 A1* | 3/2018 | Chen ..................... | G06F 3/0659 |

(Continued)

*Primary Examiner* — Tracy A Warren
(74) *Attorney, Agent, or Firm* — Harness, Dickey & Pierce, P.L.C.

(57) ABSTRACT

A storage device includes a memory die; a storage controller processor configured to control an operation performed in the memory die by scheduling a plurality of commands provided to the memory die; and memory storing a command queue corresponding to the memory die, wherein the storage controller processor is configured to, receive the plurality of commands respectively from a first tenant and a second tenant; schedule the plurality of commands in the command queue, according to the first and second tenants providing the plurality of commands; and reschedule the plurality of commands according to the operation performed in the memory die and urgency of the plurality of commands, and control the memory die to process the plurality of commands in an order different from an order in which the plurality of commands were received by the storage controller processor.

20 Claims, 19 Drawing Sheets

(56) References Cited

U.S. PATENT DOCUMENTS

| | | | |
|---|---|---|---|
| 2018/0173462 A1* | 6/2018 | Choi | G06F 3/0659 |
| 2020/0012451 A1* | 1/2020 | Benisty | G06F 13/4282 |
| 2020/0089537 A1* | 3/2020 | Bahirat | G06F 9/468 |
| 2020/0117378 A1* | 4/2020 | Hsu | G06F 3/0619 |
| 2022/0004337 A1 | 1/2022 | Cariello | G06F 9/3855 |
| 2022/0413719 A1* | 12/2022 | Wu | G06F 3/0688 |

* cited by examiner

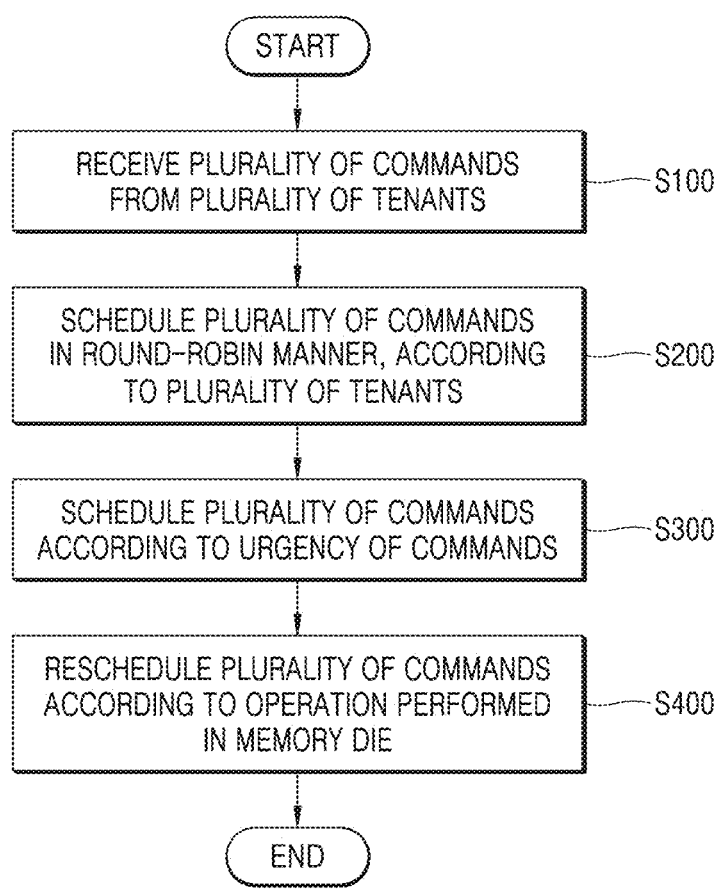

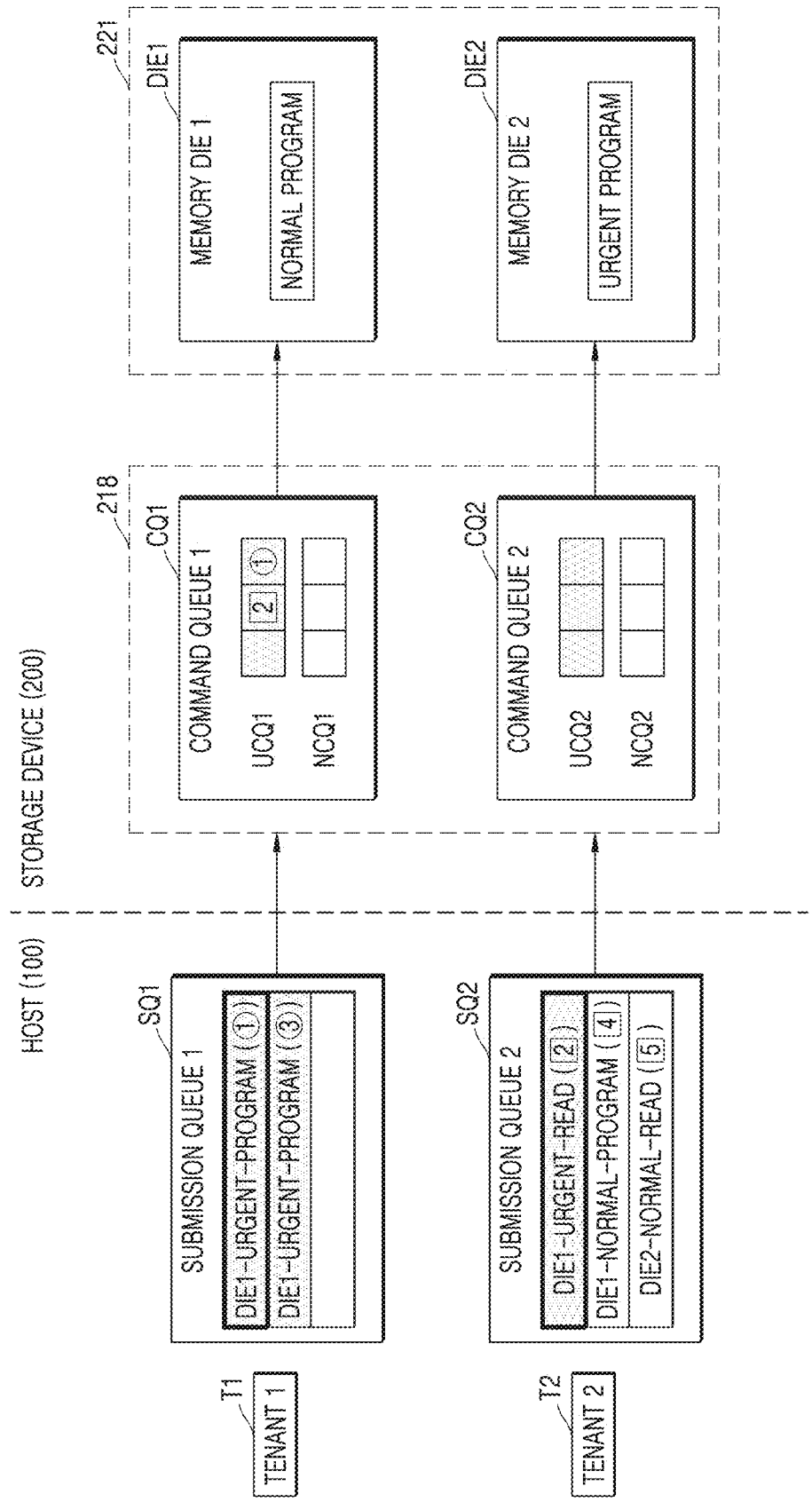

FIG. 7A

| DIE INDEX | TURN | URGENT AVAILABLE BIT | NORMAL AVAILABLE BIT | INCOMING URGENT COMMAND COUNT | OUTGOING URGENT COMMAND COUNT | INCOMING NORMAL COUNT | OUTGOING NORMAL COUNT | LAST DISPATCH COMMAND INDEX | LAST DISPATCH COMMAND TYPE |
|---|---|---|---|---|---|---|---|---|---|

| TENANT INDEX | DIE INDEX | LAST DISPATCH TENANT | TENANT AVAILABLE URGENT/NORMAL COMMAND BITMAP | LASTEST INSERT TENANT URGENT COMMAND | LASTEST DISPATCH TENANT URGENT COMMAND | LASTEST INSERT TENANT NORMAL COMMAND | LASTEST DISPATCH TENANT NORMAL COMMAND |
|---|---|---|---|---|---|---|---|
| | | | | | | | |

TA2

FIG. 8B
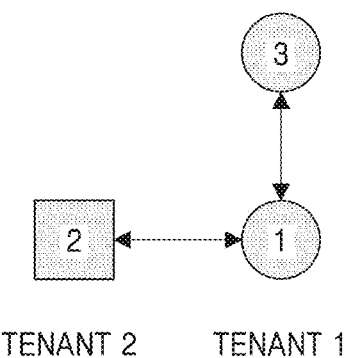
<URGENT COMMAND LINKED LIST OF DIE 1>
TENANT 2
<NORMAL COMMAND LINKED LIST OF DIE 1>

STORAGE DEVICE AND OPERATING METHOD FOR MANAGING A COMMAND QUEUE

CROSS-REFERENCE TO RELATED APPLICATION

This application is based on and claims priority under 35 U.S.C. § 119 to Korean Patent Application No. 10-2020-0172573, filed on Dec. 10, 2020, in the Korean Intellectual Property Office, the disclosure of which is incorporated by reference herein in its entirety.

BACKGROUND

One or more example embodiments of the inventive concepts relate to a storage device and an operation method of the same, and more particularly, to a storage device for scheduling commands received from a host, and an operation method of the storage device.

A storage system includes a host and a storage device. The host and the storage device are connected to each other via various standard interfaces such as Universal Flash Storage (UFS), serial ATA (SATA), Small Computer Small Interface (SCSI), serial attached SCSI (SAS), and an embedded multi-media card (eMMC). When the storage system is used in a mobile device, a high-speed operation between the host and the storage device is crucial, and the storage device is required to effectively process commands provided from the host.

SUMMARY

Technical problems to be solved by at least some example embodiments of the inventive concepts include, for example, providing a storage device for effectively processing commands from a host, and an operation method of the storage device.

According to at least some example embodiments of the inventive concepts, a storage device includes a memory die; a storage controller processor configured to control an operation performed in the memory die by scheduling a plurality of commands provided to the memory die; and memory storing a command queue corresponding to the memory die, wherein the storage controller processor is configured to, receive the plurality of commands respectively from a first tenant and a second tenant; schedule the plurality of commands in the command queue, according to the first and second tenants providing the plurality of commands; and reschedule the plurality of commands according to the operation performed in the memory die and urgency of the plurality of commands, and control the memory die to process the plurality of commands in an order different from an order in which the plurality of commands were received by the storage controller processor.

According to at least some example embodiments of the inventive concepts, a storage device includes a plurality of memory dies; a storage controller processor configured to schedule a plurality of commands provided to the plurality of memory dies and control operations performed in the plurality of memory dies; and memory storing a plurality of command queues respectively corresponding to the plurality of memory dies, wherein the storage controller processor is further configured to, schedule the plurality of commands in the plurality of command queues, according to a plurality of tenants configured to respectively provide the plurality of commands, and urgency of the plurality of commands, and reschedule the plurality of commands according to an operation performed in a memory die to which at least some of the plurality of commands are provided.

According to at least some example embodiments of the inventive concepts, there is provided an operation method of a storage device including a storage controller processor and a plurality of memory dies, the operation method including receiving a plurality of commands from a plurality of tenants, scheduling the plurality of commands in a Round-Robin manner, according to the plurality of tenants, scheduling the plurality of commands according to urgency of the plurality of commands, respectively, and rescheduling the plurality of commands according to an operation performed in a memory die to which at least some of the plurality of commands are provided.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 2 is a flowchart of an operation of a storage device, according to at least one example embodiment of the inventive concepts;

FIGS. 3A to 3C are diagrams for explaining a scheduling operation of a storage device, according to at least one example embodiment of the inventive concepts;

FIG. 7A is a diagram for explaining command information regarding a memory die that is stored in a storage controller of a storage device, according to at least one example embodiment of the inventive concepts;

FIG. 7B is a diagram for explaining command information regarding a tenant that is stored in a storage controller of a storage device, according to at least one example embodiment of the inventive concepts;

FIGS. 8A and 8B are diagrams for explaining an operation of managing commands to retrieve a command that is input from a storage controller of a storage device, according to at least one example embodiment of the inventive concepts;

DETAILED DESCRIPTION OF THE EMBODIMENTS

Figure 1:
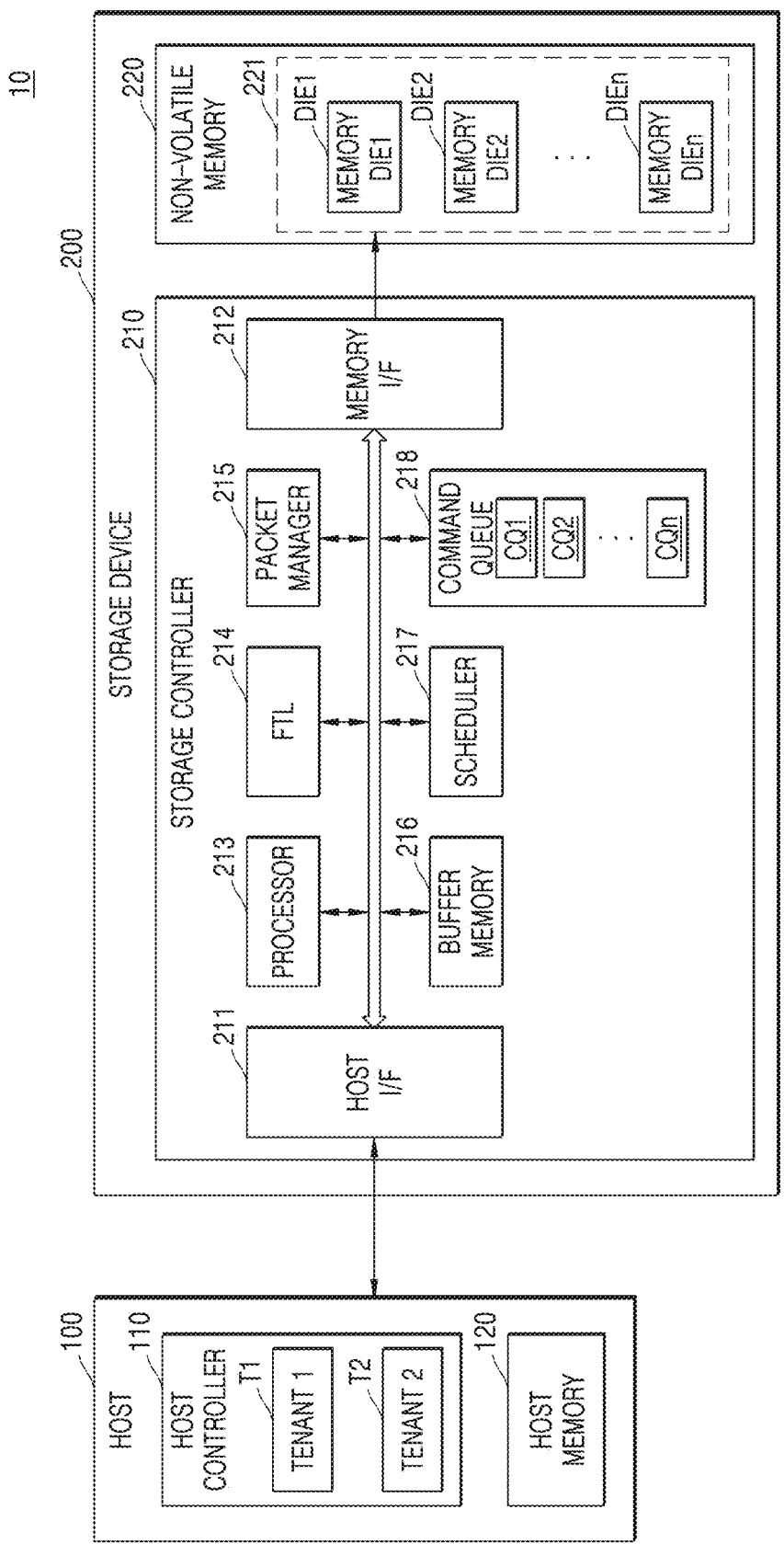
FIG. 1 is a block diagram of a host-storage system according to at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram of a host-storage system according to at least one example embodiment of the inventive concepts.

A host-storage system 10 may include a host 100 and a storage device 200. Also, the storage device 200 may include a storage controller 210 and a non-volatile memory 220. Also, according to at least one example embodiment of the inventive concepts, the host 100 may include a host controller 110 and a host memory 120. The host memory 120 may function as a buffer memory for temporarily storing data to be transmitted to the storage device 200 or data transmitted therefrom.

The storage device 200 may include storage media for storing data in response to a request from the host 100. For example, the storage device 200 may include at least one of a Solid State Drive (SSD), embedded memory, and detachable external memory. When the storage device 200 is SSD, the storage device 200 may be a device following non-volatile memory express (NVMe) standards and Compute Express Link (CXL) standards. When the storage device 200 is an embedded memory or an external memory, the storage device 200 may be a device following Universal Flash Storage (UFS) standards or eMMC standards. The host 100 and the storage device 200 may generate packets according to standard protocols respectively applied to the host 100 and the storage device 200, and may transmit the packets.

The non-volatile memory 220 of the storage device 200 may include memory dies 221 (or memory chips). For example, the memory dies 221 may include first to $n^{th}$ memory dies DIE1 to DIEn, and n may be a natural number and may be different numbers.

When the non-volatile memory 220 of the storage device 200 includes a flash memory, the flash memory may include a two-dimensional (2D) NAND memory array or a 3D (or vertical) NAND (VNAND) memory array. As another example, the storage device 200 may include different types of non-volatile memories. For example, the storage device 200 may include Magnetic RAM (MRAM), Spin-Transfer Torque MRAM, Conductive bridging RAM (CBRAM), Ferroelectric RAM (FeRAM), Phase RAM (PRAM), Resistive RAM (RRAM), and other types of memories.

In an example embodiment, the host controller 110 and the host memory 120 may be separate semiconductor chips. Alternatively, in an example embodiment, the host controller 110 and the host memory 120 may be integrated in the same semiconductor chip.

For example, the host controller 110 may be any one of modules included in an application processor, and the application processor may be realized as a System on Chip (SoC). Also, the host memory 120 may be an embedded memory included in the application processor, or a non-volatile memory or a memory module outside the application processor. The host controller 110 may be or include processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc. The processing circuitry of the host controller 110 may be configured, via hardware and/or software (e.g., firmware), to perform and/or control any operation described in the specification as being performed by a host controller or an element thereof. The host controller 110 may also be referred to in the present specification as host controller circuitry 110.

For example, different tenants, e.g., a first tenant T1 and a second tenant T2, may be executed by the host controller 110. Each tenant may be an entity that can be executed by a host (e.g., host 100) and is capable of issuing data access commands (e.g., read and/or write commands). Examples of a tenant include, but are no limited to, a process, a program, a program instance, and a virtual machine. Each of the first tenant T1 and the second tenant T2 may access the storage device 200 to store or read the data. For example, the storage device 200 may distinguish the first tenant T1 from the second tenant T2, based on physical/virtual functions of an interface (e.g., Peripheral Component Interconnection express (PCIe)), a first submission queue SQ1/a second submission queue SQ2, a namespace, an NVMe set, a stream, and the like. Alternatively, for example, the host 100 may vary identifications (IDs) respectively indicating the first tenant T1 and the second tenant T2 and Quality of Service (QoS) configurations regarding the first tenant T1 and the second tenant T2, and the storage device 200 may distinguish the first tenant T1 and the second tenant T2 from each other, according to the IDs and the QoS configurations.

FIG. 1 illustrates that two different tenants are executed by the host controller 110, but the host-storage system 10 is not limited thereto. At least three tenants may be executed by the host controller 110. Also, unlike the illustration of FIG. 1, the first tenant T1 and the second tenant T2 may be tenants executed by different hosts, respectively. For example, respective hosts may have different QoS configuration values, and the storage device 200 may distinguish the first tenant T1 from the second tenant T2 by using the QoS configuration values.

In an example embodiment, the storage device 200 may receive, from the host 100, information regarding the IDs, which are respectively assigned to the tenants, and priorities of the tenants. The storage controller 210 may assign a resource for a task requested by the user, based on the priority of each tenant. Alternatively, in an example embodiment, the storage device 200 may assign resources for tasks requested by the user, considering a bandwidth required by each tenant, a latency allowed to each tenant, a size of a memory area assigned to support each tenant, and the like.

The storage controller 210 may include a host interface 211, a memory interface 212, and a storage controller processor 213. Also, the storage controller 210 may further include a Flash Translation Layer (FTL) 214, a packet manager 215, a buffer memory 216, a scheduler 217, and a command queue 218. According to at least some example embodiments of the inventive concepts, the storage controller processor 213 may be or include hardware including logic circuits; a hardware/software combination executing software; or a combination thereof. For example, the storage controller processor more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc. The storage controller processor 213 may be configured, via hardware and/or software (e.g., firmware), to perform and/or control any operation described in the specification as being performed by a storage controller processor, a storage controller, a storage device or an element thereof (e.g., the storage controller 210 and/or non-volatile memory 220 of the storage device 200, and/or the host interface 211, memory interface 212, Flash Translation Layer (FTL) 214, packet manager 215, buffer memory 216, scheduler 217, and/or command queue 218 of the storage controller 210). For example, according to at least one example embodiment of the inventive concepts, the storage controller processor 213 is a Central Processing Unit (CPU).

The storage controller 210 may further include a memory. At least one of the FTL 214, the packet manager 215, and the scheduler 217 may be realized as software or firmware and may be loaded on a memory of the storage controller 210, thus operating according to the control of the storage controller processor 213. The command queue 218 may be stored in memory of the storage controller 210 and may be controlled by the storage controller processor 213.

According to at least some example embodiments of the inventive concepts, the memory may be used as an operation memory, a buffer memory, a cache memory, or the like, and for example, the memory may be realized as DRAM, SRAM, PRAM, or flash memory. For example, the storage controller 210 may further include a working memory on which the FTL 214 is loaded, and as the storage controller processor 213 executes the FTL, a data write and read operation on the non-volatile memory may be controlled. However, the storage controller 210 of the storage device 200 is not limited thereto, and each component of the storage controller 210 may be realized as hardware, software, or firmware.

The host interface 211 may receive/transmit the packets from/to the host 100. A packet transmitted from the host 100 to the host interface 211 may include a command, an address, data to be written to the non-volatile memory 220, or the like, and a packet transmitted from the host interface 211 to the host 100 may include a response to a command, data read from the non-volatile memory 220, or the like. The memory interface 212 may transmit the data, which is to be written to the non-volatile memory 220, to the non-volatile memory 220 or receive the data read therefrom. The memory interface 212 may be realized to comply with standard protocols such as Toggle or ONFI.

The FTL 214 may perform various functions such as address mapping, wear-leveling, and garbage collection. An address mapping operation may be an operation of switching a logical address received from the host to a physical address used to actually store the data in the non-volatile memory 220. The wear-leveling is a technique for preventing the excessive deterioration of a certain block by enabling blocks in the non-volatile memory 220 to be used uniformly. For example, the wear-leveling may be embodied by firmware technology that balances erase counts of physical blocks. The garbage collection is a technique for securing capacity available in the non-volatile memory 220 by copying effective data of an existing block to a new block and erasing the existing block.

The packet manager 215 may generate a packet according to a protocol of an interface negotiated with the host 100 or may parse a variety of information from the packet received from the host 100. For example, the packet manager 215 may obtain commands from the packet received from the host 100.

The buffer memory 216 may temporarily store data to be written to the non-volatile memory 220 or data read therefrom. The buffer memory 216 may be included in the storage controller 210 but may be outside the storage controller 210.

The scheduler 217 may schedule a process order of the commands received from the host 100. The scheduler 217 may schedule the commands and store the same in the command queue 218, according to a type (e.g., normal or urgent) of a memory die corresponding to each command and each command. In the command queue 218, the commands received from the host 100 may be temporarily buffered.

In an example embodiment, the command queue 218 may include first to $n^{th}$ command queues CQ1 to CQn. Each of the first to $n^{th}$ command queues CQ1 to CQn may be a command queue exclusive for a certain memory die from among the memory dies 221 included in the non-volatile memory 220. For example, the first command queue CQ1 may be exclusive for the first memory die DIE1, the second command queue CQ2 may be exclusive for the second memory die DIE2, and the $n^{th}$ command queue CQn may be exclusive for the $n^{th}$ memory die DIEn. The command queue 218 may be realized as a register, but one or more embodiments are not limited thereto.

FIG. 1 illustrates that n, which is the number of first to $n^{th}$ command queues CQ1 to CQn, is identical to n that is the number of first to $n^{th}$ memory dies DIE1 to DIEn. However, in the storage device 200, the number of first to $n^{th}$ command queues CQ1 to CQn may be different from the number of first to $n^{th}$ memory dies DIE1 to DIEn, and the number of first to $n^{th}$ command queues CQ1 to CQn and the number of first to $n^{th}$ memory dies DIE1 to DIEn may vary. Also, in an example embodiment, one command queue may be exclusively used by memory dies, and command queues may be exclusively used by one memory die. For example, both the first command queue CQ1 and the second command queue CQ2 may be exclusive for the first memory die DIE1, or in an example embodiment, the first command queue CQ1 may be exclusive for the first memory die DIE1 and the second memory die DIE2.

The storage controller 210 may further include an error correction code (ECC) engine. The ECC engine may perform error detection and error correction on the read data that is read from the non-volatile memory 220. In more detail, the ECC engine may generate parity bits regarding data to be written on the non-volatile memory 220, and the generated parity bits may be stored in the non-volatile memory 220 together with the write data. When the data is read from the non-volatile memory 220, the ECC engine may correct errors in the read data by using the parity bits that are read from the non-volatile memory 220 together with the read data, and may output the read data in which the errors are corrected.

The storage device 200 may respectively manage the commands, which are respectively transmitted from the first tenant T1 and the second tenant T2 that are different from each other, according to the urgency of the commands (e.g., the priority of processing the commands), and may schedule the commands. Therefore, the commands received from the first tenant T1 and the second tenant T2 may be equally processed, and an urgent command may be preferentially processed. Therefore, a Head-of-Line (HOL) blocking problem, during which commands keep being congested even though some of the memory dies 221 included in the non-volatile memory 220 do not operate, may be prevented. FIG. 2 is a flowchart of an operation of a storage device, according to at least one example embodiment of the inventive concepts.

Referring to FIGS. 1 and 2, in operation S100, the storage controller 210 of the storage device 200 may receive commands from tenants. For example, the storage controller 210 may receive the commands respectively from the first tenant T1 and the second tenant T2.

When the commands are received, the storage controller 210 may also receive logical addresses along with the commands. The storage device 200 may translate the logical addresses respectively corresponding to the commands into physical addresses. According to the translated physical addresses, memory dies may be selected from among the memory dies 221 to respectively process the commands.

Also, when the commands are received, the storage controller 210 may classify the commands according to the urgency (that is, priorities of processing the commands). For example, the commands may be respectively classified into urgent commands and normal commands. However, the storage device 200 is not limited thereto, and the commands may be classified into three or more groups according to the urgency.

In operation S200, the storage controller 210 may schedule the commands in a Round-Robin manner, according to the tenants. For example, the storage controller 210 may schedule the commands, which are respectively transmitted from the first tenant T1 and the second tenant T2, in the Round-Robin manner to enable the first tenant T1 and the second tenant T2 to equally access the memory dies 221, respectively. The storage controller 210 may schedule the first command received from the first tenant T1 and then the second command received from the second tenant T2. After scheduling the second command received from the second tenant T2, the storage controller 210 may schedule a command received from another tenant instead of the second tenant T2.

In operation S300, the storage controller 210 may schedule the commands according to the urgency thereof. The storage controller 210 may schedule an urgent command to be processed prior to a normal command in the storage device 200. Information regarding the urgency of a command may be received as information regarding a command when the storage device 200 receives the command.

The storage device 200 may preferentially process the urgent command by scheduling the commands according to the urgency of the commands and may prevent a state in which a posterior urgent command is not processed because of normal commands preceding in the command queue. That is, the HOL blocking problem may be prevented.

In operation S400, the storage controller 210 may reschedule the commands according to an operation performed in a memory die. In an example embodiment, when an urgent read command is scheduled and enqueued in the first command queue CQ1 corresponding to the first memory die DIE1 while a normal program operation according to a normal program command is performed in a certain memory die, e.g., the first memory die DIE1, the storage controller 210 may reschedule the commands to make the urgent read command be preferentially processed. The storage controller 210 may suspend the normal program operation having been performed in the first memory die DIE1 according to the transmission of the urgent read command to the first memory die DIE1 and thus may preferentially perform the urgent read operation according to the urgent read command. When the urgent read operation is completed, the normal program operation having been suspended may resume in the first memory die DIE1.

In an example embodiment, before operation S400 is performed, the storage controller 210 may perform an operation of determining whether an address of the normal program command, which is processed in a certain memory die, is identical to an address of the urgent read command and may perform operation S400 according to a determination result. For example, when the normal program operation according to the normal program command is performed in a certain memory die and when the address of the enqueued urgent read command is identical to the address of the normal program command, the storage controller 210 may reschedule the commands to preferentially process the urgent read command, and when the address of the enqueued urgent read command is different from the address of the normal program command, the storage controller 210 may not reschedule the commands to preferentially process the urgent read command. However, the storage controller 210 is not limited thereto, and the storage controller 210 may reschedule the commands to preferentially process the urgent read command, regardless of whether the address of the enqueued urgent read command is identical to the address of the normal program command.

The storage device 200 may perform a rescheduling operation of changing the process order of the urgent command to enable the urgent command to be preferentially processed in a memory die on which the urgent command is scheduled. Therefore, a problem, which may be caused as the urgent read command is not processed because of a preceding program command, may be solved, and the QoS of a read operation may be improved.

Operations S200 to S400 may be performed by the scheduler 217 of the storage controller 210. FIG. 2 illustrates that operation S300 is performed after operation S200, but the operation method of the storage device 200 is not limited thereto. Operation S200 may be performed after operation S300, or operations S200 and S300 may be performed in parallel.

Figure 3B:
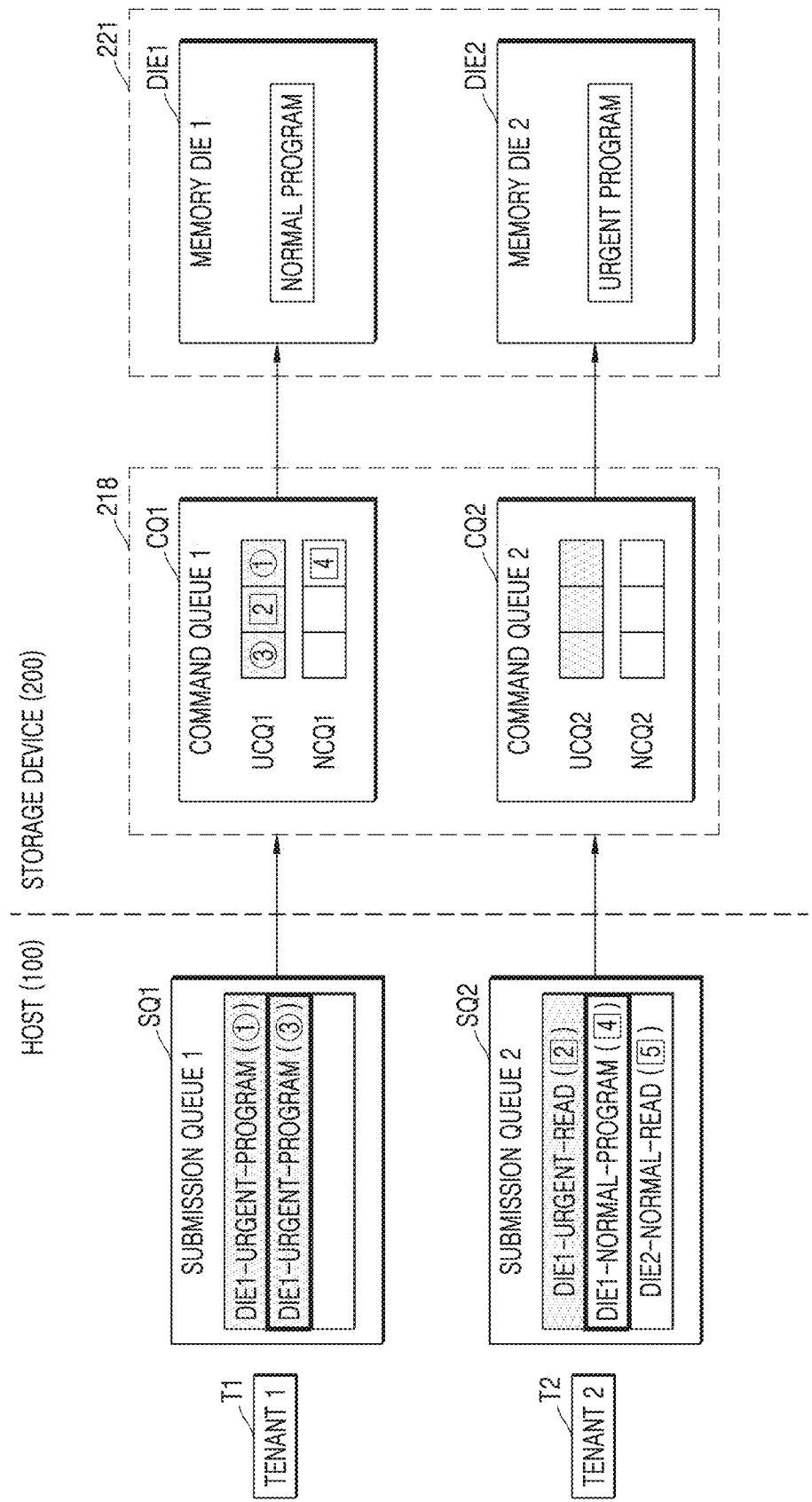
Figure 3C:
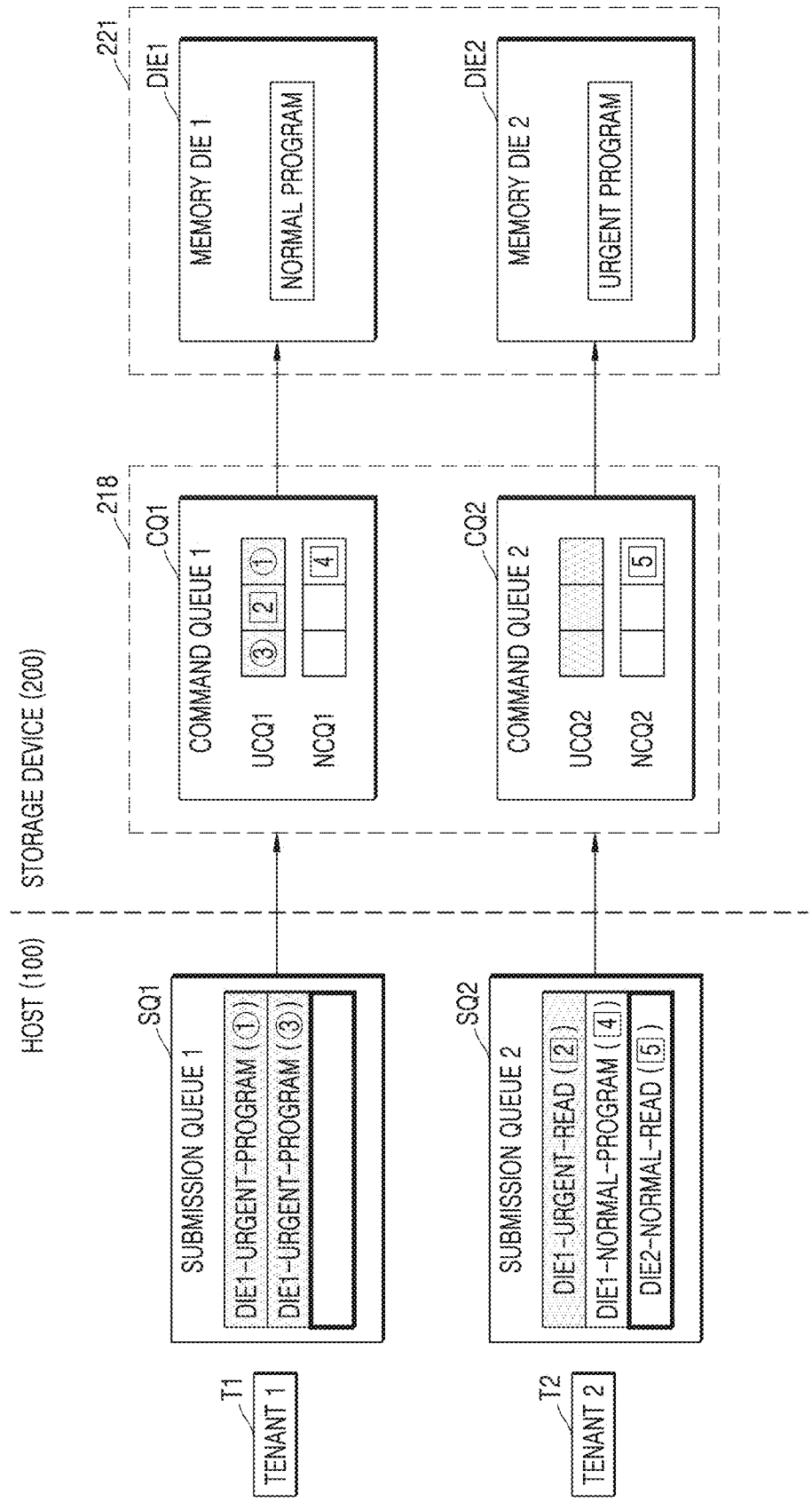
Figure 4:
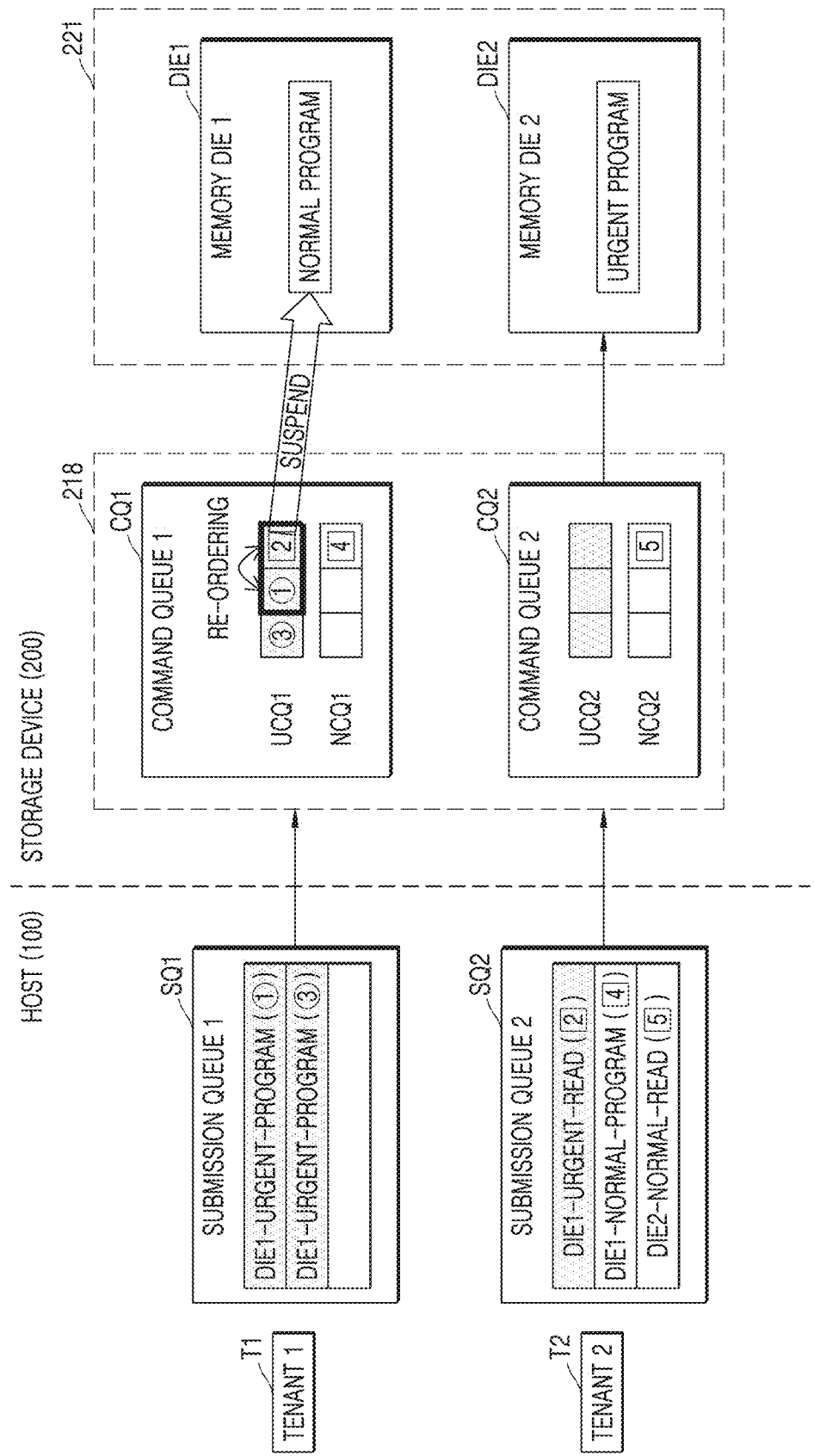
FIG. 4 is a diagram for explaining a scheduling operation of a storage device, according to at least one example embodiment of the inventive concepts.

FIGS. 3A to 3C are diagrams for explaining a scheduling operation of a storage device, according to at least one example embodiment of the inventive concepts and illustrate operations S200 and S300 of FIG. 2. FIG. 4 is a diagram for explaining a scheduling operation of a storage device, according to at least one example embodiment of the inventive concepts and illustrates operation S400 of FIG. 2. FIGS. 3A to 3C respectively show the scheduling operation time-serially performed.

Referring to FIG. 3A, the first tenant T1 may manage a first submission queue SQ1, and the second tenant T2 may manage a second submission queue SQ2. Each of the first submission queue SQ1 and the second submission queue SQ2 may be a queue in which various types of events including commands from the host 100 are arranged to be processed. The commands stored in the first submission queue SQ1 and the second submission queue SQ2 may be fetched by a host controller (e.g., the host controller 110 of FIG. 1) and thus transmitted to the storage device 200. For example, each of the first submission queue SQ1 and the second submission queue SQ2 may be generated in a space of a host memory (e.g., the host memory 120 of FIG. 1) of the host 100. Also, for example, the first submission queue SQ1 and the second submission queue SQ2 may be realized as circular queues, but are not limited thereto.

The commands respectively stored in the first submission queue SQ1 and the second submission queue SQ2 may include addresses on which the commands are to be processed, the urgency of the commands, and information regarding types of the commands. For example, in the first submission queue SQ1, a first command that is an urgent program command to be processed in the first memory die DIE1 may be stored, and then, a third command that is an urgent program command to be processed in the first memory die DIE1 may be stored. Also, for example, in the second submission queue SQ2, a second command that is an urgent read command to be processed in the first memory die DIE1 may be stored, a fourth command that is a normal program command to be processed in the first memory die DIE1 may be stored, and a fifth command that is a normal read command to be processed in the second memory die DIE2 may be stored. For example, the urgent command may be set to be processed prior to the normal command in the storage device 200. However, the commands stored in the first submission queue SQ1 and the second submission queue SQ2 of FIG. 3A are merely examples and not limited thereto. Commands having different characteristics may be stored in the first submission queue SQ1 and the second submission queue SQ2, and the commands may be classified into three or more types according to the urgency of the commands.

The storage device 200 may receive the commands from the host 100, manage the commands according to corresponding tenants, manage the commands according to corresponding memory dies, and manage the commands according to the urgency thereof.

The storage device 200 may include command queues respectively corresponding to the memory dies. The memory dies 221 included in the non-volatile memory 220 may include the first memory die DIE1 and the second memory die DIE2, and the command queue 218 may include the first command queue CQ1 and the second command queue CQ2. According to at least some example embodiments of the inventive concepts, the first command queue CQ1 may be a command queue exclusive for the first memory die DIE1, and the second command queue CQ2 may be a command queue exclusive for the second memory die DIE2.

In the first command queue CQ1, the commands may be classified according to the urgency and stored. For example, the first command queue CQ1 may include a first urgent command queue UCQ1, in which an urgent command is stored, and a first normal command queue NCQ1, in which a normal command is stored. In an example embodiment, commands stored in the first urgent command queue UCQ1 may be processed in the first memory die DIE1 prior to commands stored in the first normal command queue NCQ1.

In an example embodiment, the memory controller of the storage device 200 may provide urgent commands, which are enqueued in the first urgent command queue UCQ1, to the first memory die DIE1 by as much as the number according to a first threshold value and then may provide normal commands, which are enqueued in the first normal command queue NCQ1, to the first memory die DIE1. According to at least some example embodiments of the inventive concepts, the first threshold value may be set to prevent a constant delay in processing normal commands because of an urgent command and may be set in advance or may vary according to a state of the first memory die DIE1.

The commands may be classified according to the urgency and stored in the second command queue CQ2. For example, the second command queue CQ2 may include a second urgent command queue UCQ2, in which urgent commands are stored, and a second normal command queue NCQ2, in which normal commands are stored. Commands stored in the second urgent command queue UCQ2 may be processed in the second memory die DIE2 prior to commands stored in the second normal command queue NCQ2.

In an example embodiment, the memory controller of the storage device 200 may provide urgent commands, which are enqueued in the second urgent command queue UCQ2, to the second memory die DIE2 by as much as the number according to a second threshold value and then may provide normal commands, which are enqueued in the second normal command queue NCQ2, to the second memory die DIE2. According to at least some example embodiments of the inventive concepts, the second threshold value is set to prevent a constant delay in processing normal commands because of an urgent command and may be set in advance or may vary according to a state of the second memory die DIE2. The first threshold value and the second threshold value may be identical or different from each other.

The storage device 200 may schedule the commands according to the urgency thereof and thus may preferentially process the urgent command. Therefore, a state, in which a posterior urgent command is not processed because of normal commands preceding in a command queue, may be prevented. That is, the HOL blocking problem may be prevented.

The storage controller of the storage device 200 may schedule the commands, which are respectively transmitted from the first tenant T1 and the second tenant T2, in the Round-Robin manner to enable the first tenant T1 and the second tenant T2 to equally access the memory dies 221.

The storage device 200 may store the first command from the first tenant T1 in the first urgent command queue UCQ1 of the first command queue CQ1 and then the second command from the second tenant T2 in the first urgent command queue UCQ1 of the first queue CQ1. FIG. 3A illustrates the command scheduling operation according to the first tenant T1 and the second tenant T2, but one or more embodiments are not limited thereto. When a third tenant accesses the storage device 200, the first command from the first tenant T1 and the second command from the second tenant T2 may be stored in the first command queue CQ1, and then a command from the third tenant may be stored.

Referring to FIG. 3B, the storage device 200 may store the third command from the first tenant T1 in the first urgent command queue UCQ1 of the first command queue CQ1. That is, in the first urgent command queue UCQ1 of the first command queue CQ1, the first command, the second command, and the third command may be sequentially stored and scheduled. Then, the storage device 200 may store a fourth command from the second tenant T2 in the first normal command queue NCQ1 of the first command queue CQ1.

That is, although the storage controller of the storage device 200 receives the second command from the second tenant T2 after sequentially receiving the first and third commands from the first tenant T1, the storage device 200 may store the first command from the first tenant T1 in the first urgent command queue UCQ1 of the first command queue CQ1, store the second command from the second tenant T2 in the first urgent command queue UCQ1 of the first command queue CQ1 and then store the third command from the first tenant T1 in the first urgent command queue UCQ1 of the first command queue CQ1. Accordingly, the storage controller of the storage device 200 may schedule the commands to enable the first tenant T1 and the second tenant T2 to equally access the memory dies 221, respectively.

Referring to FIG. 3C, the storage device 200 may store a fifth command received from the second tenant T2 in a normal command queue of the second command queue CQ2.

When an urgent read command is enqueued in a command queue corresponding to a certain memory die while a normal program operation according to a normal program command is performed in the memory die, the storage device 200 may transmit an urgent read command to the memory die to make a command having relatively high urgency be preferentially processed. Accordingly, the operation having been performed in the above memory die may be suspended, and an urgent read operation may be performed according to the urgent read command. However, as in the first urgent command queue UCQ1 of the first command queue CQ1 shown in FIG. 3C, when the first command is scheduled before the second command, the first command that is the urgent program command has to be preferentially transmitted to the first memory die DIE1 prior to the second command that is the urgent read command, and thus, the normal program operation having been performed in the first memory die DIE1 is not suspended.

Referring to FIGS. 3C and 4, when the urgent read command is scheduled later than the urgent program command in an urgent command queue (e.g., the first urgent command queue UCQ1) included in the command queue 218, the storage controller of the storage device 200 may re-order the commands to make the urgent read command be processed first in the urgent command queue. When the urgent read command is set to be processed first in the urgent command queue, and when an operation according to a current normal program command is performed in a memory die, the storage controller may transmit the urgent read command even though the operation according to the normal program command is not completed in the memory die. When the urgent read command is received while the operation according to the current normal program command is performed in the memory die, the operation may be set to be suspended in the memory die.

For example, as illustrated in FIG. 3C, the normal program operation is performed in the first memory die DIE1, and as the commands are scheduled in the Round-Robin manner, the first command and then the second command that is a read command may be enqueued in the first urgent command queue UCQ1 of the first command queue CQ1. Therefore, as illustrated in FIG. 4, the storage device 200 may change orders of the first command and the second command, thus performing rescheduling to make the second command be processed prior to the first command. Because a next command to be processed in the first memory die DIE1 is the second command that is the urgent read command, the second command may be transmitted to the first memory die DIE1, and the normal program operation in the first memory die DIE1 may be suspended. The first memory die DIE1 may read data according to the second command. The normal program operation having been suspended may resume in the first memory die DIE1 after the urgent read operation is performed.

The storage device 200 may perform the rescheduling operation of changing a process order of the urgent read command to make the urgent read command be preferentially processed in the first memory die DIE1 on which the urgent read command is scheduled. Changing the process order of the urgent read command may include changing a position of the urgent read command in a process order. A position of the urgent read command in a process order may also be referred to as a process order position of the urgent read command. For example, in the example illustrated in FIGS. 3A-3C and 4, a process order position of the urgent read command DIE1-URGENT READ (2) is changed from second to first in the process order of the first urgent command queue UCQ1 of the command queue CQ1, and a process order position of the urgent program command DIE1-URGENT-PROGRAM(1) is changed from first to second in the process order of the first urgent command queue UCQ1 of the command queue CQ1. Therefore, a problem, which may be caused as the urgent read command is not processed because of a preceding program command, may be solved, and the QoS of a read operation may be improved.

Figure 5:
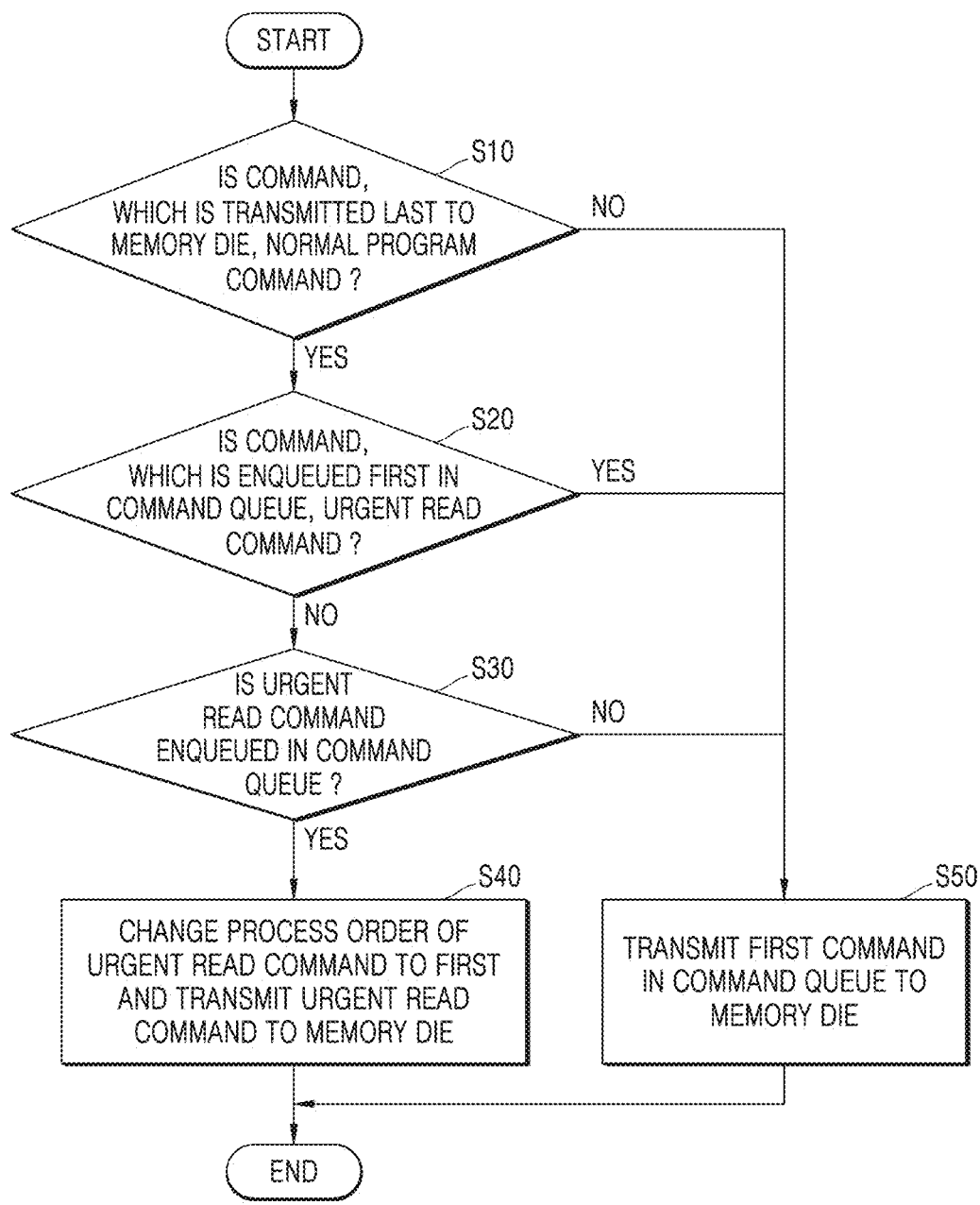
FIG. 5 is a flowchart of an operation of a storage device, according to at least one example embodiment of the inventive concepts.

FIG. 5 is a flowchart of an operation of a storage device, according to at least one example embodiment of the inventive concepts and illustrates an example of operation S400 of FIG. 1. Operation S400 may include operations S10 to S50.

Operations of FIG. 5 may be respectively performed in first to $n^{th}$ command queues (e.g., the first to $n^{th}$ command queues CQ1 to CQn of FIG. 1) respectively corresponding to first to $n^{th}$ memory dies (e.g., the first to $n^{th}$ memory dies DIE1 to DIEn). For example, the storage device may perform operations regarding the first command queue CQ1 and the first memory die DIE1 that are described below, perform in parallel operations regarding the second command queue CQ2 and the second memory die DIE2 that are described below, and perform in parallel operations regarding the $n^{th}$ command queue CQn and the $n^{th}$ memory die DIEn that are described below.

Referring to FIG. 5, in operation S10, the storage controller of the storage device may determine whether a command transmitted last to a certain memory die is a normal program command. For example, the storage controller may store information regarding the command transmitted to the non-volatile memory device. The storage controller may determine which command is the command transmitted last, based on the information.

In operation S20, the storage controller may determine whether the first command enqueued in the command queue corresponding to the certain memory die is an urgent read command. In operation S30, the storage controller may determine whether the urgent read command is enqueued in the command queue corresponding to the certain memory die. That is, the storage controller may determine whether the command, which is scheduled first from among the commands scheduled to be processed in the certain memory die, is the urgent read command in operation S20 and may determine whether the urgent read command is included in the commands scheduled to be processed in the certain memory die in operation S30.

When it is determined in operation S10 that the command, which is transmitted last to the certain memory die, is not a normal program command, or when it is determined in operation S20 that the first command in the command queue corresponding to the certain memory die is the urgent read command, or when it is determined in operation S30 that the urgent read command is not enqueued in the command queue corresponding to the certain memory die, the storage controller may perform operation S50. In operation S50, the storage controller may transmit the first command of the commands, which are enqueued in the command queue, to a memory die corresponding to the command queue. According to at least some example embodiments of the inventive concepts, when it is determined that the operation having been performed in the memory die is completed, the storage controller may transmit the first command to the memory die, or although the operation having been performed in the memory die is not completed, the storage controller may transmit the first command to the memory die. After the operation having been performed is completed, an operation of processing the first command may be performed in the memory die.

On the contrary, when it is determined in operation S10 that the command transmitted last to the certain memory die is the normal program command, when it is determined in operation S20 that the first command of the command queue corresponding to the certain memory die is not the urgent read command, and when it is determined in operation S30 that the urgent read command is enqueued in the command queue corresponding to the certain memory die, the storage controller may perform operation S40. In operation S40, the storage controller may change the urgent read command, which is enqueued in the command queue, to be processed first, and according to a changed process order, the storage controller may transmit the urgent read command to the certain memory die. As the process order of the commands is changed, process orders of other commands may be pushed one by one. In the certain memory die, the normal program operation having been performed may be suspended, and the urgent read operation according to the received urgent read command may be performed.

In an example embodiment, before performing operation S40, the storage controller may determine whether a program command, which has the same address as the urgent read command, is enqueued before the urgent read command and may perform operation S40 according to a determination result. For example, when the program command, which has the same address as the urgent read command, is enqueued before the urgent read command, the storage controller may maintain the process order of the urgent read command, but when the program command, which has the same address as the urgent read command, is not enqueued before the urgent read command, the storage controller may change the process order of the urgent read command. However, the storage controller is not limited thereto. The storage controller may perform operation S40 without determining whether the program command, which has the same address as the urgent read command, is enqueued before the urgent read command.

Figure 6:
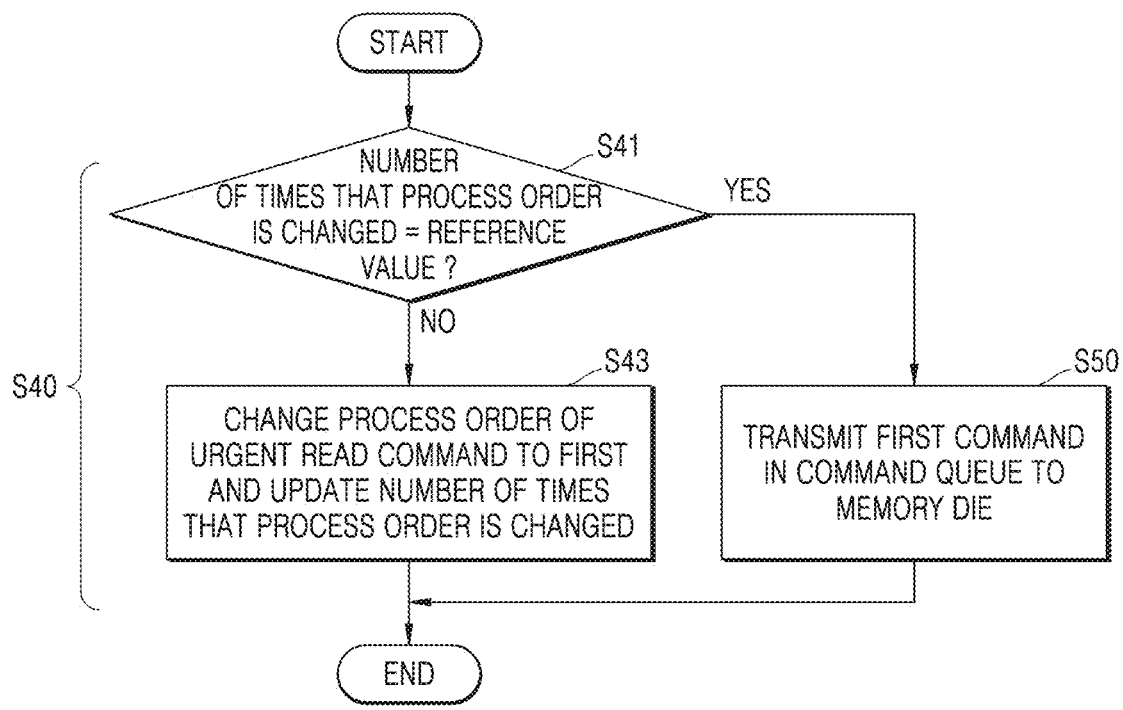
FIG. 6 is a flowchart of an operation of a storage device, according to at least one example embodiment of the inventive concepts.

FIG. 6 is a flowchart of an operation of a storage device, according to at least one example embodiment of the inventive concepts and illustrates an example of operation S40 of FIG. 5. Operation S40 may include operations S41 to S43.

Operations of FIG. 6 may be respectively performed in first to $n^{th}$ command queues (e.g., the first to $n^{th}$ command queues CQ1 to CQn of FIG. 1) respectively corresponding to first to $n^{th}$ memory dies (e.g., the first to $n^{th}$ memory dies DIE1 to DIEn). For example, the storage device may perform operations regarding the first command queue CQ1 and the first memory die DIE1 that are described below, perform in parallel operations regarding the second command queue CQ2 and the second memory die DIE2 that are described below, and perform in parallel operations regarding the $n^{th}$ command queue CQn and the $n^{th}$ memory die DIEn that are described below.

Referring to FIG. 6, in operation S41, the storage controller of the storage device may determine whether the number of times that process orders of commands are changed in a certain urgent command queue reaches a reference value. For example, as illustrated in FIG. 4, when the orders of the first command and the second command are changed in the first urgent command queue UCQ1 of the first command queue CQ1, the number of times that the orders are changed is counted, and a count value may be stored in the storage controller of the storage device 200. The storage controller may compare the above count value with a reference value and determine whether the count value reaches the reference value. According to at least some example embodiments of the inventive concepts, the reference value may be set in advance in the storage controller or may be a value changing according to a state of the first memory die DIE1. Also, the reference value may be set identically for the first to $n^{th}$ command queues CQ1 to CQn or may differ.

When the number of times that the process orders are changed fails to reach the reference value, that is, when the number of times that the process orders are changed is less than the reference value, the storage controller may change the urgent read command, which is enqueued in the command queue, to be processed first and may update the number of times that the process orders are changed, in operation S43. A value obtained by counting the number of times that the process orders are changed may be updated.

On the contrary, when it is determined that the number of times that the process orders are changed reaches the reference value, the storage controller may no longer change the process orders of the commands enqueued in the command queue and may perform operation S50.

When a process order of a posterior urgent read command in the command queue is continuously changed to a first, another command (e.g., the first command that is the urgent program command of FIG. 3), which was scheduled to be processed first, may keep being pushed back and fail to be processed. Therefore, by limiting the number of times that the process orders are changed within the reference value, an excessive delay of an operation of processing the urgent program command may be prevented.

FIG. 7A is a diagram for explaining command information regarding a memory die that is stored in a storage controller of a storage device, according to at least one example embodiment of the inventive concepts. FIG. 7B is a diagram for explaining command information regarding a tenant that is stored in a storage controller of a storage device, according to at least one example embodiment of the inventive concepts.

Referring to FIG. 7A, the storage controller may store a first table TA1 including command information regarding each memory die. In an example embodiment, the first table TA1 may include entries of which the number corresponds to the number of memory dies.

The storage controller of the storage device according to the present embodiment may limit the number of commands that may be processed in each memory die. The storage controller may manage the first table TA1 to equally provide the tenants with a chance to access a certain memory die and to schedule the commands according to the urgency of the commands in each memory die. The storage controller may use the first table TA1 to select a memory die, in which the command received from the host is preferentially processed, from among the memory dies.

The first table TA1 may include information regarding a die index indicating each memory die and information regarding a turn indicating a turn of a command to be processed next in a corresponding memory die. For example, when an operation of processing a current normal command is performed in the memory die, the information regarding the turn may be set to process the urgent command. Alternatively, for example, while urgent commands, of which the number is equal to or greater than a threshold value, are continuously processed in the memory die, the information regarding the turn may be set to process a normal command.

The first table TA1 may further include: information regarding an urgent available bit indicating whether there is an urgent command that has to be processed in the memory die, a normal available bit indicating whether there is a normal command that has to be processed in the memory die, and an incoming urgent command count indicating the number of received urgent commands corresponding to the memory die; information regarding an outgoing urgent command count indicating the number of urgent commands that are dequeued from a command queue corresponding to the memory die; information regarding an incoming normal command count indicating the number of received normal commands corresponding to the memory die; and information regarding an outgoing normal command count indicating the number of normal commands that are dequeued from the command queue corresponding to the memory die. For example, when an urgent command corresponding to the memory die is received, the information regarding the urgent available bit and the incoming urgent command count may be updated, and when the scheduled urgent command is provided to the memory die, the information regarding the urgent available bit and the outgoing urgent command count may be updated. Also, for example, when the normal command corresponding to the memory die is received, the information regarding the normal available bit and the incoming normal command count may be updated, and when the scheduled normal command is provided to the memory die, the information regarding the normal available bit and the outgoing normal command count may be updated. When the outgoing normal command count and the outgoing urgent command count are greater than a preset value (e.g., the number of commands processible in the memory die all at once), the storage controller may reset the urgent available bit and the normal available bit and thus may not schedule a command corresponding to the memory die.

Also, the first table TA1 may include: information regarding a last dispatch command index indicating a memory die on which a command is dispatched last, that is, a command is scheduled, from among the memory dies; and information regarding a type of the last dispatch command indicating a type of the command dispatched last. According to at least some example embodiments of the inventive concepts, the types of commands may differ according to whether the command is a read command, a program command, an urgent command, or a normal command. The storage controller may schedule a command not corresponded with a memory die, in which the command is dispatched last, but in another memory die, based on the information regarding the last dispatched command index and the information regarding a type of the last dispatched command.

Referring to FIG. 7B, the storage controller may store a second table TA2 including command information regarding each tenant. In an example embodiment, the second table TA2 may include as many entries as the number corresponding to the multiplication of tenants and memory dies.

The storage controller of the storage device may manage the second table TA2 to equally distribute the commands received from the tenants respectively for the tenants in the Round-Robin manner, not in an order in which the commands are received. The storage controller may use the second table TA2 to determine which command of a tenant is scheduled in a memory die.

The second table TA2 may include information regarding a tenant index indicating each tenant, information regarding a die index indicating each memory die, and information regarding a last dispatched tenant indicating a tenant corresponding a command that is dispatched last in the corresponding memory die. The storage controller may schedule a command, which is received not from a tenant transmitting the last dispatched command but from another tenant, based on the information regarding the last dispatched tenant, and as a new command is scheduled, the storage controller may update the information regarding the last dispatched tenant.

The second table TA2 may further include information regarding tenant available urgent/normal command bitmaps that indicate whether the urgent command received from the tenant is enqueued in the command queue corresponding to the memory die and whether the normal command received from the tenant is enqueued in the command queue corresponding to the memory die. The tenant available urgent/normal command bitmap may indicate whether the urgent command and the normal command corresponding to the tenant and the memory die are scheduled.

Also, the second table TA2 may include: information regarding an insert tenant urgent command that indicates that an urgent command corresponding to the tenant and the memory die is received; information regarding a dispatch tenant urgent command that indicates that the urgent command corresponding to the tenant and the memory die is dispatched last; information regarding an insert tenant normal command that indicates that a normal command corresponding to the tenant and the memory die is received; and information regarding a tenant normal command that indicates the normal command corresponding to the tenant and the memory die is dispatched last. Therefore, although the commands required from a certain tenant to an identical memory die are received early by the storage device, the memory controller may preferentially schedule commands received from other tenants by using the second table TA2.

Figure 8A:
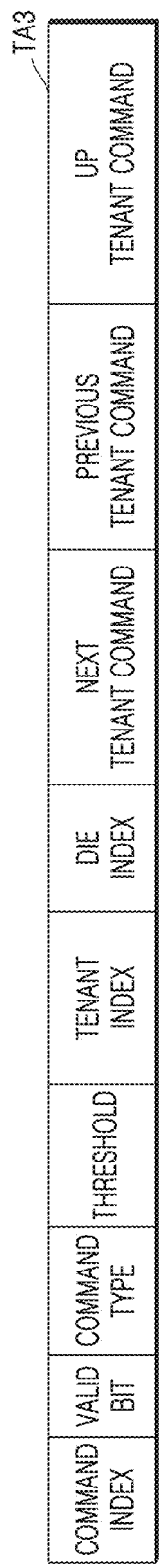

FIGS. 8A and 8B are diagrams for explaining an operation of managing commands to retrieve a command that is input from a storage controller of a storage device, according to at least one example embodiment of the inventive concepts.

Referring to FIGS. 8A and 8B, a third table TA3 including information regarding respective commands may be stored to manage the commands transmitted to the storage device. In an example embodiment, the third table TA3 may include as many entries as the total number of commands processible in the storage device. For example, a total queue depth of all command queues (e.g., the command queue 218 of FIG. 1) in the storage device is 1024, the number of entries of the third table T3 may be 1024. The storage controller may retrieve the commands transmitted to the storage device by using the third table TA3, and thus, a retrieval speed may increase.

The third table T3 may include at least one of: information regarding an index of a received command; information regarding an effective bit indicating whether a corresponding command is effective and a type of the corresponding command; information regarding a threshold value regarding the number of times that an order of the corresponding command is changed; information regarding a tenant index corresponding to the corresponding command; information regarding a memory die index corresponding to the corresponding command; information regarding a next tenant command that indicates a command according to a tenant having a next index value of an index value of a tenant corresponding to the corresponding command; information regarding a previous tenant command that means a command according to a tenant having a previous index value of the index value of the tenant corresponding to the corresponding command; and information regarding an up tenant command that indicates a command received from the tenant corresponding to the corresponding command after the corresponding command. The storage controller may use the third table TA3 to manage, in a linked list manner, the commands received by the storage device.

According to at least some example embodiments of the inventive concepts, the information regarding the threshold value regarding the number of times that the order of the corresponding command is changed may be set to schedule other commands preferentially to the corresponding command and limit the number of times that an existing process order of the corresponding command is pushed back. Therefore, a delay of a process time of a certain command may be prevented, the delay occurring as a process order of the certain command from among the commands, which are received by the storage device, keeps being pushed back.

Referring to FIGS. 3C and 8B, the commands received by the storage device may be managed in the linked list manner. The commands may form different linked lists according to the memory dies as well as types of the commands (e.g., urgent commands or normal commands).

For example, first to fourth commands, which are scheduled to be processed in the first memory die, may respectively form an urgent command linked list and a normal command linked list. The first to third commands may form the urgent command linked list, and the fourth command may form the normal command linked list. According to at least some example embodiments of the inventive concepts, in the urgent command linked list, the first command and the third command received from the same tenant, that is, the first tenant, may be connected to each other in a vertical direction, that is, connected to each other by an up pointer. In the urgent command linked list, the first command from the first tenant and the second command from the second tenant may be connected to each other in a front-rear direction, that is, connected to each other by a previous/next pointer.

Figure 9:
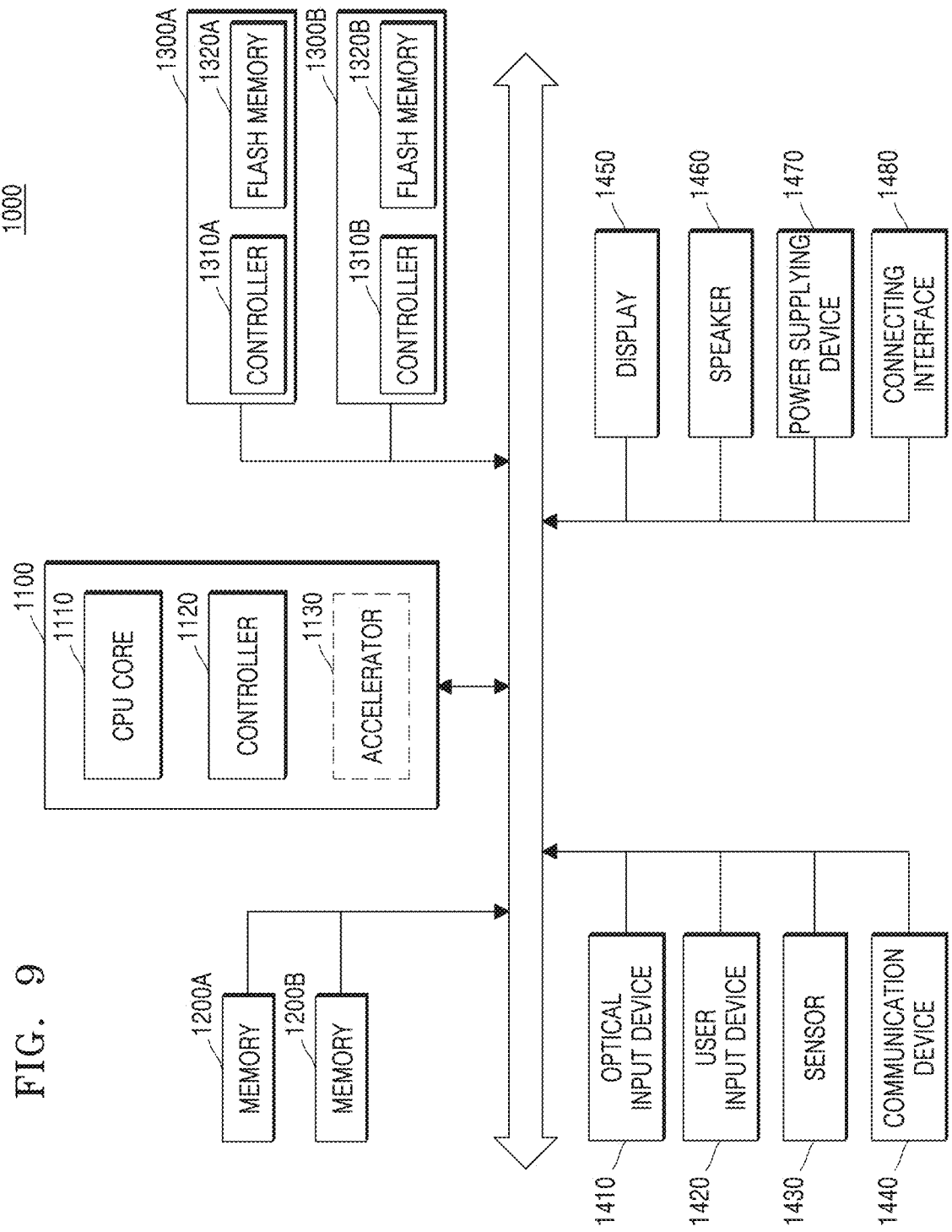
FIG. 9 is a diagram of a system to which a storage device is applied, according to at least one example embodiment of the inventive concepts.

FIG. 9 is a diagram of a system to which a storage device is applied, according to at least one example embodiment of the inventive concepts.

Referring to FIG. 9, a system 1000 of FIG. 9 may be basically a mobile system such as a mobile phone, a smartphone, a tablet personal computer (PC), a wearable device, a healthcare device, or an Internet of Things (IoT) device. However, the system 1000 of FIG. 9 is not limited thereto. The system 1000 may be, for example, a PC, a laptop, a server, a media player, or an automotive equipment such as a navigation device.

Referring to FIG. 9, the system 1000 may include a main processor 1100, memories 1200A and 1200B, and storage devices 1300a and 1300b and may further include one or more of an optical input device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components forming the system 1000. The main processor 1100 may be realized as a general-purpose processor, an exclusive processor, an application processor, or the like.

The main processor 1100 may include at least one CPU core 1110 and may further include a controller 1120 for controlling the memories 1200a and 1200b and/or the storage devices 1300a and 1300b. According to an embodiment, the main processor 1100 may further include an accelerator 1130 that is an exclusive circuit for high-speed data computations such as Artificial Intelligence (AI) data computations. The accelerator block 1130 may include a Graphics Processing Unit (GPU), a Neural Processing Unit (NPU), a Data Processing Unit (DPU), and/or the like, and may be realized as a chip physically separated from other components of the main processor 1100.

The memories 1200a and 1200b may be used as main memory devices of the system 1000 and may include volatile memories such as SRAM and/or DRAM. However, the memories 1200a and 1200b may include non-volatile memories such as PRAM and/or RRAM. The memories 1200a and 1200b may be integrally formed in the same package as the main processor 1100.

The storage devices 1300A and 1300B may each function as a non-volatile storage device storing therein data, regardless of power supply and may have relatively larger capacity than the memories 1200a and 1200b. The storage devices 1300a and 1300b may include controller 1310A and 1310B and—flash memory 1320A 1320B) storing data under the control of the storage controllers 1310a and 1310b. The flash memory 1320A 1320B may include NAND flash memories, but may include other types of NVMs such as PRAM and/or RRAM.

The storage devices 1300a and 1300b may be physically separated from the main processor 1100 in the system 1000, or the storage devices 1300a and 1300b and the main processor 1100 may be in the same package. Also, the storage devices 1300a and 1300b may each be, for example, an SSD or a memory card, and thus may be detachably coupled to other components of the system 1000 through an interface such as the connecting interface 1480 described below. The storage devices 1300a and 1300b may each be a device to which standard protocols such as UFS are applied. The storage devices 1300a and 1300b may be realized as the storage device 200 described with reference to FIGS. 1 to 8.

The optical input device 1410 may capture still images or moving images and may be a camera, a camcorder, a webcam, and/or the like.

The user input device 1420 may receive various types of data input from a user of the system 1000 and may be a touch pad, a keypad, a keyboard, a mouse, a microphone, and/or the like.

The sensor 1430 may detect diverse physical quantities that may be obtained from the outside of the system 1000 and may convert the detected physical quantities into electrical signals. The sensor 1430 may be a temperature sensor, a pressure sensor, an illumination sensor, a position sensor, an acceleration sensor, a biosensor, a gyroscope, and/or the like.

The communication device 1440 may receive and transmit signals from and to other devices outside the system 1000, according to diverse communication protocols. The communication device 1440 may include an antenna, a transceiver, a modem, and/or the like.

The display 1450 and the speaker 1460 may function as output devices respectively outputting visual information and auditory information provided to the user of the system 1000.

The power supplying device 1470 may appropriately convert power supplied from a battery embedded in the system and/or external power and may provide the power to each component of the system 1000.

The connecting interface 1480 may connect the system 1000 to an external device connected to the system 1000 and exchanging data with the same. The connecting interface 1480 may be realized in various interface methods such as Advanced Technology Attachment (ATA), SATA, external SATA (e-SATA), SCSI, SAS, PCI, PCIe, NVMe, IEEE 1394, Universal Serial Bus (USB), a Secure Digital (SD) card, an MMC, an eMMC, UFS, eUFS, and a CF card interface.

Figure 10:
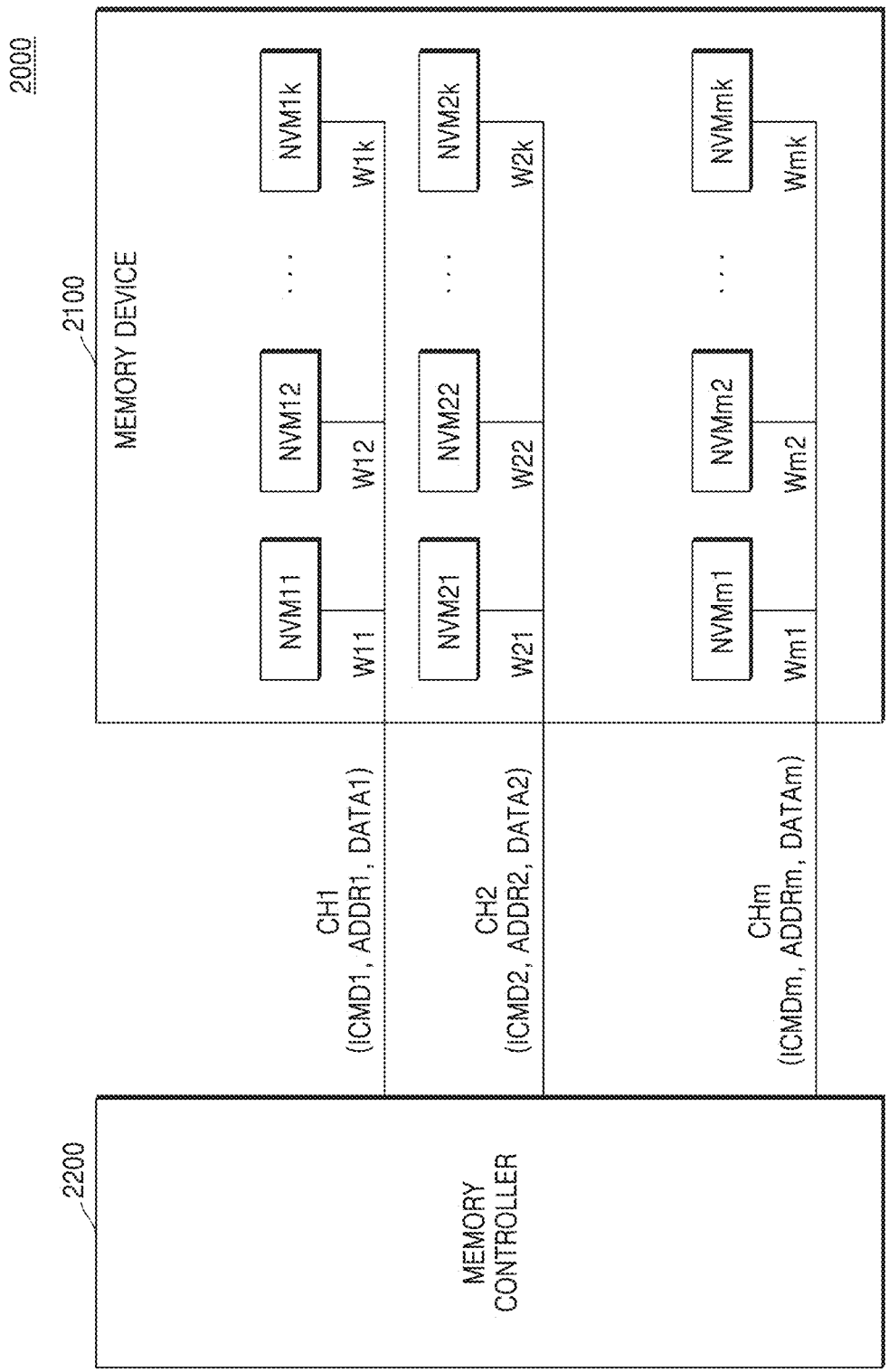
FIG. 10 is a block diagram of a memory system according to an embodiment.

FIG. 10 is a block diagram of a memory system according to an embodiment. Referring to FIG. 10, a memory system 2000 may include a memory device 2100 and a memory controller 2200. The memory system 2000 may support first to $m^{th}$ channels CH1 to CHm, and the memory device 2100 and the memory controller 2200 may be connected to each other through the channels CH1 to CHm. For example, the memory system 2000 may be realized as a storage device such as SSD, the memory controller 2200 may correspond to the storage controller 210 of FIG. 1, and the memory device 2100 may correspond to the non-volatile memory 220 of FIG. 1.

The memory device 2100 may include NVM devices NVM11 to NVMmk. Each of the NVM devices NVM11 to NVMmn may be connected to one of the channels CH1 to CHm through a corresponding way. For example, the NVM devices NVM11 to NVMmn may be connected to the first channel CH1 through ways W11 to W1n W1k, and non-volatile memories NVM21 to NVM2k may be connected to the second channel CH2 through ways W21 to W2k. In an example embodiment, each of the NVM devices NVM11 to NVMmk may be in an arbitrary memory unit operable according to an individual command from the memory controller 2200. For example, each of the NVM devices NVM11 to NVMmk may be a memory chip or a memory die, but one or more embodiments are not limited thereto. For example, the NVM devices NVM11 to NVMmk may respectively correspond to the first to $n^{th}$ memory dies DIE1 to DIEn.

The memory controller 2200 may receive/transmit signals from/to the memory device 2100 through the channels CH1 to CHm. For example, the memory controller 2200 may transmit, to the memory device 2100, commands ICMD1 to ICMDm, addresses ADDR1 to ADDRm, and data DATA1 to DATAm through the channels CH1 to CHm or may receive the data DATA1 to DATAm from the memory device 2100.

The memory controller 2200 may select one of the NVM devices connected to corresponding channels respectively through the channels and may exchange signals with the selected NVM device. For example, the memory controller 2200 may select the NVM device NVM11 from among the NVM devices NVM11 to NVMmn connected to the first channel CH1. The memory controller 2200 may transmit the command ICMD1, the address ADDR1, and the data DATA1 to the selected NVM device NVM11 through the first channel CH1 or may receive the data DATA1 from the selected NVM device NVM11.

The memory controller 2200 may receive/transmit signals from/to the memory device 2100 in parallel through different channels. For example, while transmitting the command ICMD1 to the memory device 2100 through the first channel CH1, the memory controller 2200 may transmit the command ICMD2 to the memory device 2100 through the second channel CH2. For example, while receiving the data DATA1 from the memory device 2100 through the first channel CH1, the memory controller 2200 may receive the data DATA2 from the memory device 2100 through the second channel CH2.

The memory controller 2200 may control all operations of the memory device 2100. The memory controller 2200 may respectively control the NVM devices NVM11 to NVMmn connected to the channels CH1 to CHm by transmitting the signals to the channels CH1 to CHm. For example, the memory controller 2200 may control a selected one of the NVM devices NVM11 to NVMmn by transmitting the command ICMD1 and the address ADDR1 to the first channel CH1.

Each of the NVM devices NVM11 to NVMmn may operate according to the control of the memory controller 2200. For example, the non-volatile memory device NVM11 may program the data DATA1 according to the command ICMD1, the address ADDR1, and the data DATA1 provided to the channel CH1. For example, the non-volatile memory device NVM21 may read the data DATA2 according to the command ICMD2 and the address ADDR2 provided to the second channel CH2 and may transmit the read data DATA2 to the memory controller 2200.

FIG. 10 illustrates that the memory device 2100 communicates with the memory controller 2200 through m channels and includes n non-volatile memory devices respectively corresponding to the channels. However, the number of channels and the number of non-volatile memory devices connected to one channel may vary.

Figure 11:
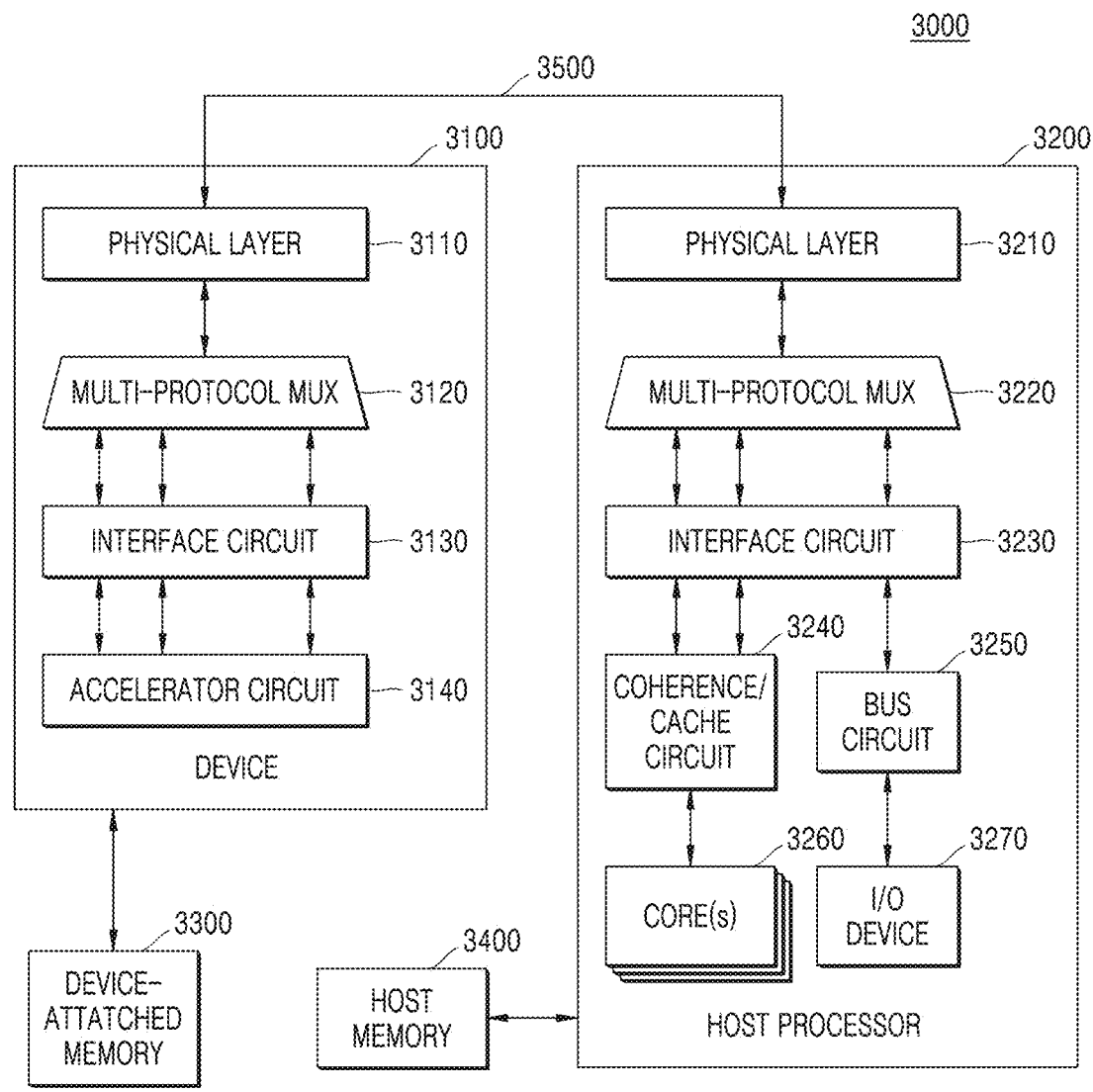
FIG. 11 is a block diagram of a system according to at least one example embodiment of the inventive concepts.

FIG. 11 is a block diagram of a system 3000 according to at least one example embodiment of the inventive concepts.

The system 3000 may be an arbitrary computing system (or a component included in a computing system) including a device 3100 for intercommunication and a host processor 3200. For example, the system 3000 may be included in a stationary computing system such as a desktop computer, a server, or a kiosk or a portable computing system such as a laptop, a mobile phone, or a wearable device. Also, in some embodiments, the system 3000 may be included in a System-on-Chip (SoC) or a System-in-package (SiP) in which the device 3100 and the host processor 3200 are integrated in one chip or package. As illustrated in FIG. 11, the system 3000 may include the device 3100, the host processor 3200, a device-attached memory 3300, and a host memory 3400.

In some embodiments, the device-attached memory 3300 may be omitted from the system 3000.

Referring to FIG. 11, the device 3100 and the host processor 3200 may communicate with each other via a link 3500 and may transmit or receive messages and/or data to or from the link 3500. At least some example embodiments of the inventive concepts will be described by referencing the link 3500 based on CXL specification supporting CXL protocols. However, as a non-limited example, the device 3100 and the host processor 3200 may intercommunicate with each other according to coherent interconnect technologies such as Xbus protocols, NVLink protocols, Infinity Fabric protocols, Cache Coherent Interconnect for Accelerators (CCIX) protocols, and Coherent Accelerator Processor Interface (CAPI).

In some embodiments, the link 3500 may support multiple protocols, and messages and/or data may be transmitted according to the protocols. For example, the link 3500 may support the CXL protocols including non-coherent protocols (e.g., CXL.io), coherent protocols (e.g., CXL.cache), and memory access protocols (or memory protocols) (e.g., CXL.mem). In some embodiments, as a non-limited example, the link 3500 may support protocols such as PCI, PCIe, USB, and SATA. In the present specification, the protocols supported by the link 3500 may be referred to as interconnection protocols.

The device 3100 may denote an arbitrary device providing a function useful for the host processor 3200, and in some embodiments, the device 3100 may correspond to an accelerator following the CXL specification. For example, software executed on the host processor 3200 may offload at least part of computing and/or input/output (I/O) works to the device 3100. In some embodiments, the device 3100 may include at least one of a programmable component such as a GPU or an NPU, a component, e.g., Intellectual Property (IP) core, which provides a fixed function, and a reconfigurable component such as a Field Programmable Gate Array (FPGA). As illustrated in FIG. 11, the device 3100 may include a physical layer 3110, a multi-protocol multiplexer 3120, an interface circuit 3130, and an accelerator circuit 3140 and may communicate with the device-attached memory 3300.

The accelerator circuit 3140 may perform the useful function provided by the device 3100 to the host processor 3200 and may be referred to as an accelerator logic. As illustrated in FIG. 11, when the device-attached memory 3300 is included in the system 3000, the accelerator circuit 3140 may communicate with the device-attached memory 3300 and may communicate with the device-attached memory 3300, based on protocols independent from the link 3500, that is, device-specific protocols. Also, as illustrated in FIG. 11, the accelerator circuit 3140 may communicate with the host processor 3200 through the interface circuit 3130 by using multiple protocols.

The interface circuit 3130 may determine one of the protocols, based on the messages and/or the data for communication between the accelerator circuit 3140 and the host processor 3200. The interface circuit 3130 may be connected to at least one protocol queue included in the multi-protocol multiplexer 3120 and may exchange the messages and/or data with the host processor 3200 through the at least one protocol queue. In some embodiments, the interface circuit 3130 and the multi-protocol multiplex 3120 may be integrated into one component. In some embodiments, the multi-protocol multiplex 3120 may include protocol queues respectively corresponding to the protocols supported by the link 3500. Also, in some embodiments, the multi-protocol multiplex 3120 may arbitrate communications according to different protocols and may provide selected communications to the physical layer 3110. In some embodiments, the physical layer 3110 may be connected to a physical layer 3210 of the host processor 3200 through single interconnection, a bus, a trace, or the like.

The host processor 3200 may be a main processor of the system 3000, for example, a Central Processing Unit (CPU), and in some embodiments, the host processor 3200 may correspond to a host processor (or a host) following the CXL specification. As illustrated in FIG. 11, the host processor 3200 may be connected to the host memory 3400 and may include the physical layer 3210, a multi-protocol multiplexer 3220, an interface circuit 3230, a coherence/cache circuit 3240, a bus circuit 3250, at least one core 3260, and an I/O device 3270.

The at least one core 3260 may execute instructions and may be connected to the coherence/cache circuit 3240. The coherence/cache circuit 3240 may include a cache hierarchy and may be referred to as a coherence/cache logic. As illustrated in FIG. 11, the coherence/cache circuit 3240 may communicate with at least one core 3260 and the interface circuit 3230. For example, the coherence/cache circuit 3240 may enable communication according to two or more protocols including a coherent protocol and a memory access protocol. In some embodiments, the coherence/cache circuit 3240 may include a Direct Memory Access (DMA) circuit. The I/O device 3270 may be used for the communication with the bus circuit 3250. For example, the bus circuit 3250 may be a PCIe logic, and the I/O device 3270 may be a PCIe I/O device.

The interface circuit 3230 may enable communication between components of the host processor 3200, for example, communication between the coherence/cache circuit 3240 and the bus circuit 3250 and the device 3100. In some embodiments, the interface circuit 3230 enable communication of messages and/or data between the components of the host processor 3200 and the device, according to multiple protocols such as non-coherent protocols, coherent protocols, and memory protocols. For example, the interface circuit 3230 may determine one of the protocols, based on the messages and/or data for communication between the components of the host processor 3200 and the device 3100.

The multi-protocol multiplexer 3220 may include at least one protocol queue. The interface circuit 3230 may be connected to at least one protocol queue and may exchange the messages and/or the data with the device 3100 through the at least one protocol queue. In some embodiments, the interface circuit 3230 and the multi-protocol multiplexer 3220 may be integrated into one component. In some embodiments, the multi-protocol multiplexer 3220 may include multiple protocol queues respectively corresponding to the protocols supported by the link 3500. Also, in some embodiments, the multi-protocol multiplexer 3220 may arbitrate communications according to different protocols and may provide the selected communications to the physical layer 3210.

The storage device of FIGS. 1 to 8B may be accessed by the device 3100 and the host processor 3200 or by various peripheral devices that are not shown in FIG. 11.

Figure 12:
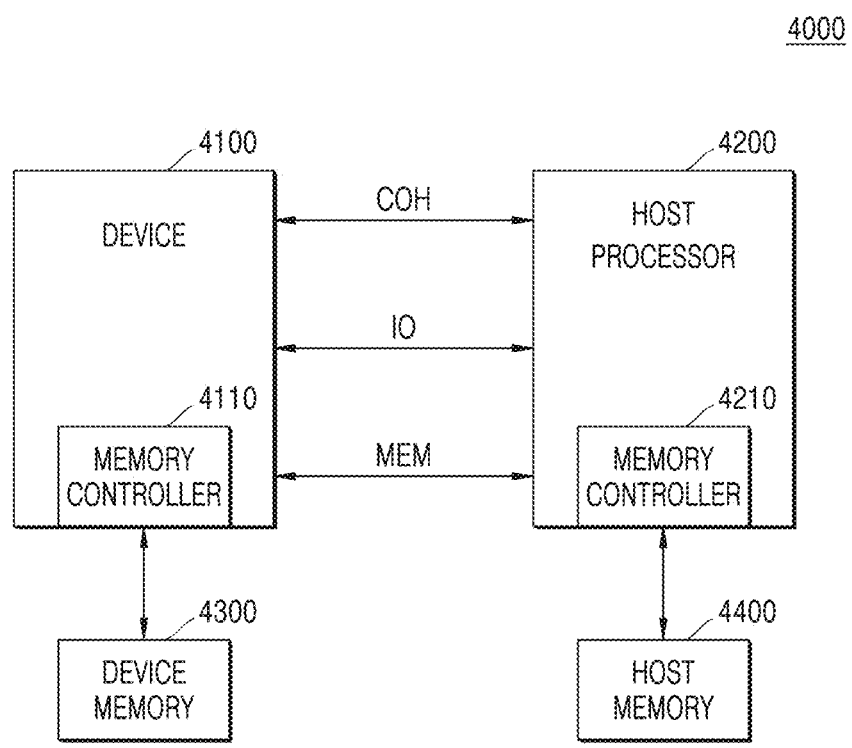
FIG. 12 is a block diagram of a system according to at least one example embodiment of the inventive concepts.

FIG. 12 is a block diagram of a system 4000 according to at least one example embodiment of the inventive concepts.

Referring to FIG. 12, the system 4000 may include a device 4100, a host processor 4200, a device memory 4300, and a host memory 4400. In some embodiments, the device memory 4300 may correspond to the device-attached memory 3300 of FIG. 11.

As described with reference to FIG. 11, the device 4100 and the host processor 4200 may intercommunicate with each other according to multiple protocols. The protocols may include a memory protocol MEM, a coherent protocol COH, and a non-coherent protocol IO. In some embodiments, referring to CXL specification 2.0, the memory protocol MEM, the coherent protocol COH, and the non-coherent protocol IO may correspond to CXL.mem, CXL.cache, and CXL.io, respectively. The non-coherent protocol IO may correspond to a PCIe transaction hierarchy and may be used for a device search of the system 400, interrupt management, access provision to a register, and signal error processing.

The memory protocol MEM may be used when the host processor 4200 accesses a memory (the device-attached memory 3300 of FIG. 11) of an accelerator (e.g., the accelerator circuit 3140 of FIG. 11). The memory protocol MEM may define transactions between a master and a subordinate.

The master may denote an agent that triggers a request in the CXL.mem protocols. For example, in the case of transactions for a MemRd command, the master may correspond to the host processor 4200 that triggers the MemRd command.

The subordinate may denote an agent responsible for a response to the request triggered by the master in the CXL.mem protocols. For example, in the case of the transactions for the MemRd command, the subordinate may correspond to a memory device. The memory device may be the host memory 3400 or the device-attached memory 3300 of FIG. 11.

The memory protocol MEM may define a transaction from the master to the subordinate and a transaction from the subordinate to the master. For example, referring to the CXL specification 2.0, the transaction from the master to the subordinate may be referred to as a Master to Subordinate (M2S) transaction, and the transaction from the subordinate to the master may be referred to as a Subordinate to Master (S2M) transaction.

According to various embodiments, the device 4100 may correspond to any one of at least three types. When the system 4000 does not include the host memory 4400, the device 4100 may correspond to a first type 1 defined in the CXL specification. In the system 4000 including the device 4100 of the first type, the protocols may only include the coherent protocol COH and the non-coherent protocol IO. When the device 4100 corresponds to the first type, the host processor 4200 may cache, in the device memory 4300, data of the host processor 4200 by using the device 4100. When the device 4100 corresponds to the first type, the system 4000 may support Device to Host (D2H) cache coherence and a Host to Device (H2D) snoop transaction.

When the device 4100 operates as an accelerator (when the device 4100 includes the accelerator circuit 3140 of FIG. 11), the device 4100 may correspond to the second type 2 defined in the CXL specification. In the system 4000 including the device 4100 of the second type, the protocols may include all of the coherent protocol COH, the non-coherent protocol IO, and the memory protocol MEM. For example, the host processor 4200 may retrieve the device 4100 according to the non-coherent protocol IO, access the device memory 4300 corresponding to the retrieved device 4100 according to the memory protocol MEM, and may allow the device 4100 to use a memory of the host processor 4200 according to the coherent protocol COH.

When the device 4100 operates as a device for memory expansion, the device 4100 may correspond to a third type 3 defined in the CXL specification. In the system 4000 including the device 4100 of the third type, the protocols may include the memory protocol MEM and the non-coherent protocol 10. For example, the host processor 4200 may identify and connect the device 4100 according to the non-coherent protocol IO and may access a memory pool of the device 4100 according to the memory protocol MEM. The device 4100 may communicate with the device memory 4300 and may include a memory controller 4110 for accessing the device memory 4300. In some embodiments, unlike the illustration of FIG. 12, the memory controller 4110 may be outside the device 4100 or may be integrated with the device memory 4300. Also, the host processor 4200 may communicate with the host memory 4400 and may include the memory controller 4210 for accessing the host memory 4400. In some embodiments, unlike the illustration of FIG. 12, the memory controller 4210 may be outside the host processor 4200 or may be integrated with the host memory 4400.

According to various embodiments, the device memory 4300 may be realized as various types of memories, for example, a Storage Class Memory (SCM).

The SCM may have characteristics of a non-volatile memory as well as a volatile memory and may access in byte units. For example, the SCM may include phase-change RAM (PCM), FeRAM, MRAM, RRAM, STT-MRAM, or the like. In an example embodiment, the storage device of FIGS. 1 to 8B may be realized as the device memory 4300 of FIG. 12.

Figure 13A:
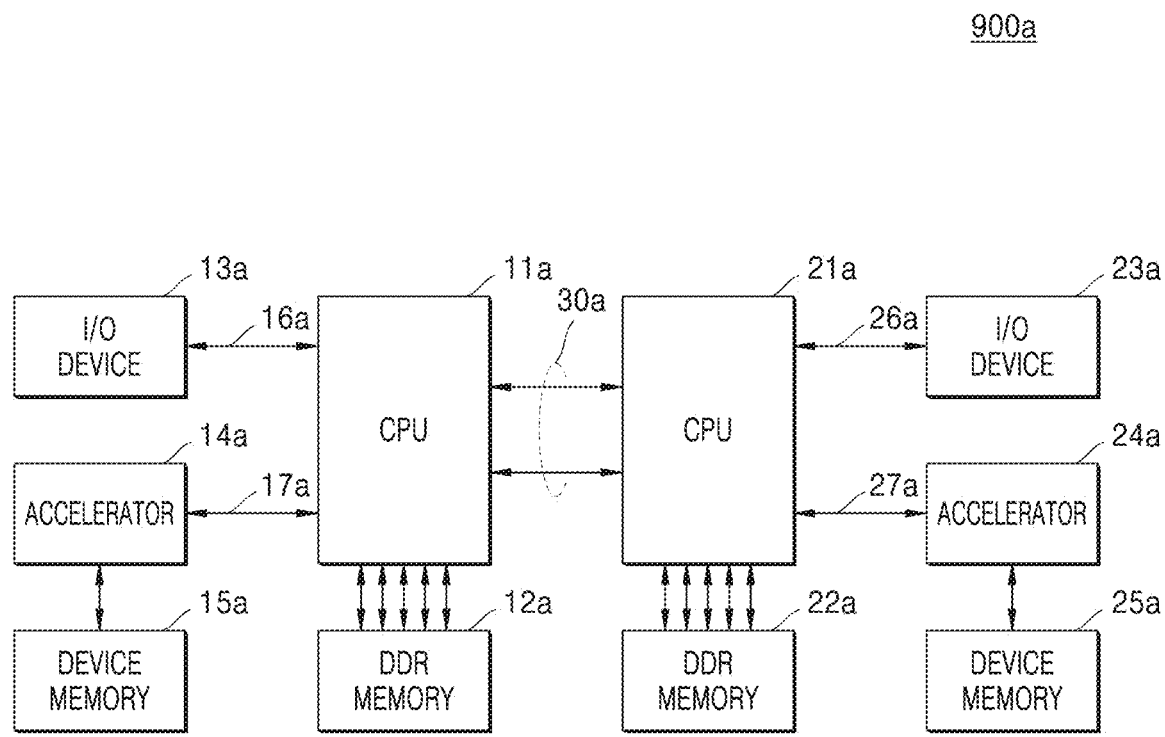
FIGS. 13A and 13B are block diagrams of examples of a system according to at least one example embodiment of the inventive concepts.
Figure 13B:
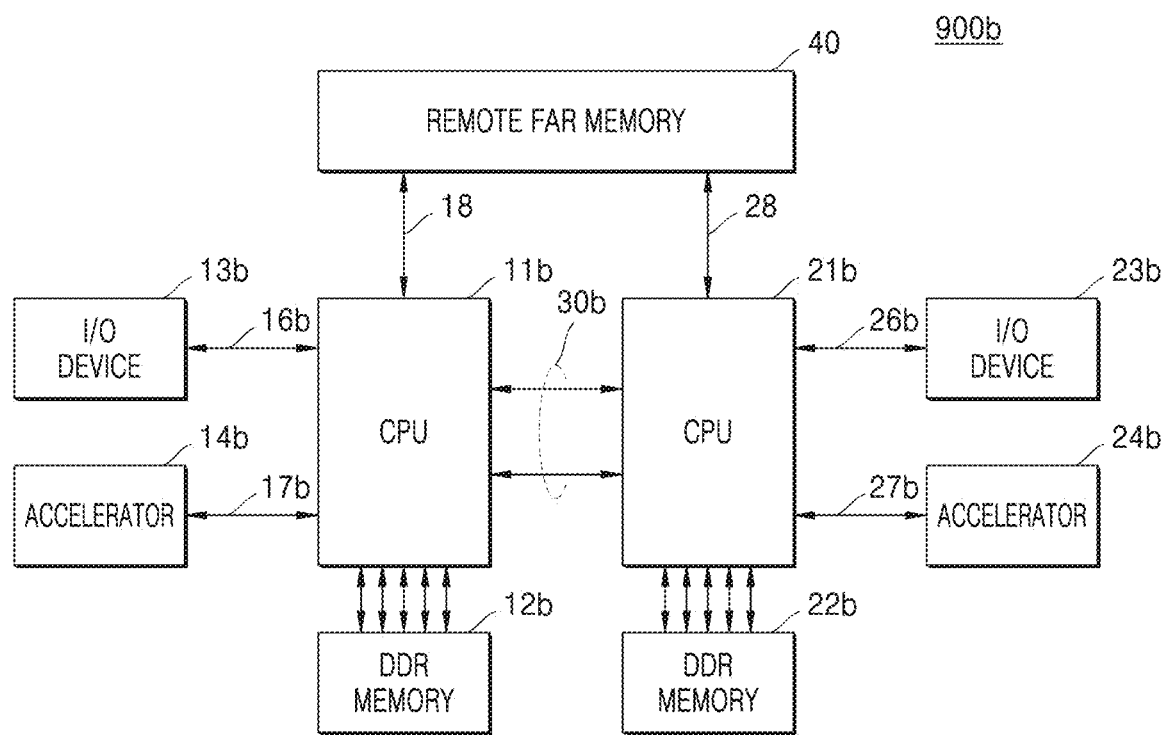

FIGS. 13A and 13B are block diagrams of examples of a system according to at least one example embodiment of the inventive concepts.

In detail, the block diagrams of FIGS. 13A and 13B show systems 900a and 900b each including multiple CPUs. Hereinafter, the descriptions provided above will not be repeated.

Referring to FIG. 13A, the system 900a may include a first CPU 11a and a second CPU 21a and first and second Double Data Rate (DDR) memories 12a and 22a respectively connected to the first and second CPUs 11a and 21a. The first and second CPUs 11a and 21a may be connected to each other through an interconnecting system 30a, based on processor interconnection technology. As illustrated in FIG. 13A, the interconnecting system 30a may provide at least one coherent CPU-to-CPU link.

The system 900a may include a first I/O device 13a and a first accelerator 14a that communicate with the first CPU 11a and may include a first device memory 15a connected to the first accelerator 14a. The first CPU 11a and the first I/O device 13a may communicate with each other via a bus 16a, and the first CPU 11a and the first accelerator 14a may communicate with each other via a bus 17a. Also, the system 900a may include a second I/O device 23a and a second accelerator 24a that communicate with the second CPU 21a and may include a second device memory 25a connected to the second accelerator 24a. The second CPU 21a and the second I/O device 23a may communicate with each other via a bus 26a, and the second CPU 21a and the second accelerator 24a may communicate with each other via a bus 27a.

Protocol-based communications may be performed through the buses 16a, 17a, 26a, and 27a, and the protocols may support selective and parallel access operations described above with reference to the drawings. Accordingly, the access latency of memories, for example, the first device memory 15a, the second device memory 25a, the first DDR memory 12a and/or the second DDR memory 22a, may decrease, and the performance of the system 900a may be improved.

Referring to FIG. 13B, similar to the system 900a of FIG. 13a, the system 900b may include first and second CPUs 11b and 21b, first and second DDR memories 12b and 22b, first and second I/O devices 13b and 23b, and first and second accelerators 14b and 24b, and may further include a remote far memory 40. The first and second CPUs 11b and 21b may intercommunicate with each other via an interconnection system 30b. The first CPU 11b may be connected to the first and second I/O devices 13b and 23b through buses 16b and 17b, and the second CPU 21b may be connected to the first and second accelerators 14b and 24b through buses 26b and 27b.

The first and second CPUs 11b and 21b may be connected to the remote far memory 40 through first and second buses 18 and 28. The remote far memory 40 may be used for the memory expansion in the system 900b, and the first and second buses 18 and 28 may be used as memory expansion ports. In addition to the buses 16b, 17b, 26b, and 27b, protocols corresponding to the first and second buses 18 and 28 may support access operations on the memory, the access operations being described with reference to the drawings. Accordingly, the access latency of the remote far memory 40 may decrease, and the performance of the system 900b may be improved.

Figure 14:
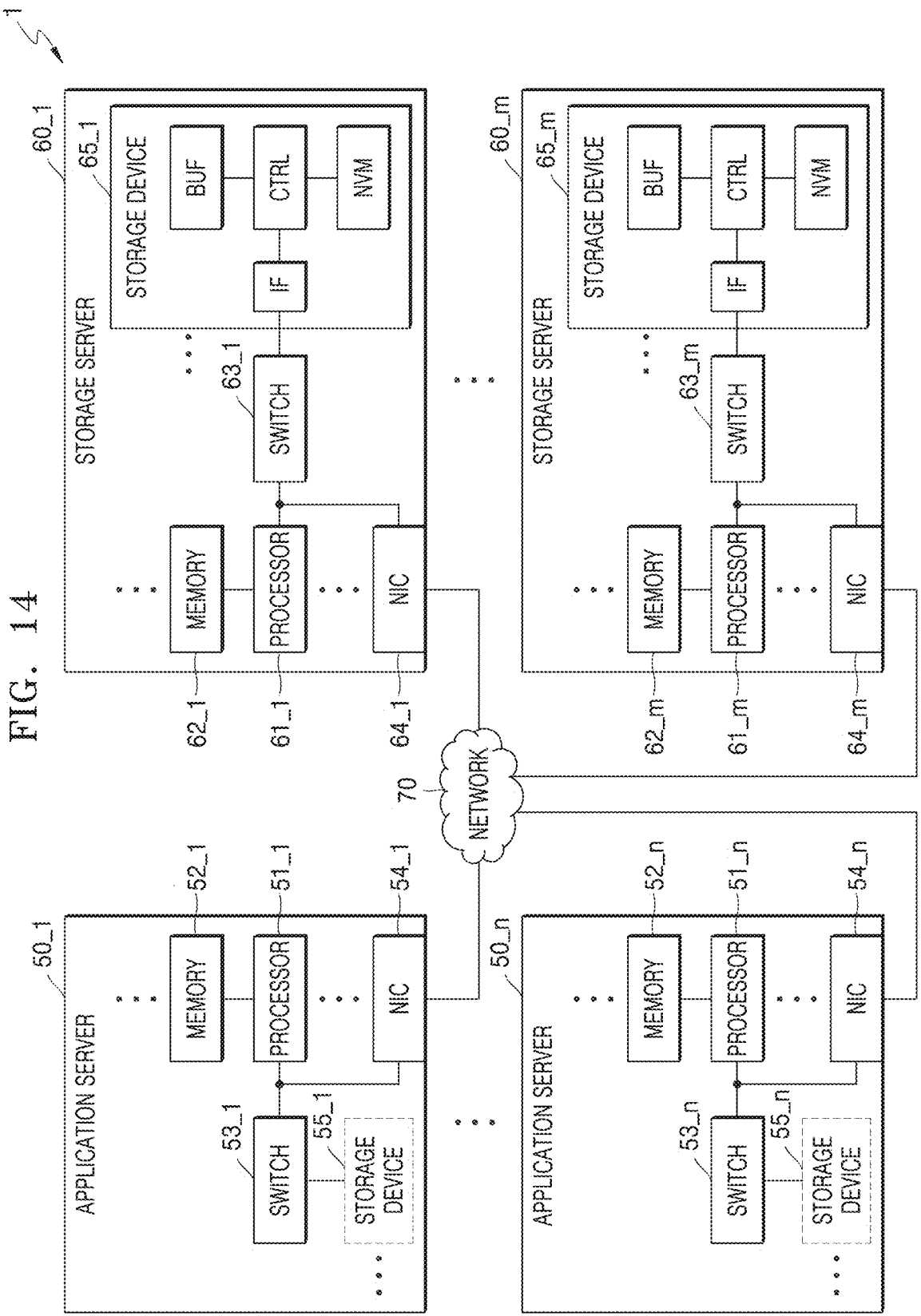
FIG. 14 is a block diagram of a data center including a system, according to at least one example embodiment of the inventive concepts.

FIG. 14 is a block diagram of a data center including a system, according to at least one example embodiment of the inventive concepts.

Referring to FIG. 14, the system described in some embodiments may be included in a data center 1 as an application server and/or a storage server. Also, embodiments regarding selective and parallel error correction operations of a memory controller that are applied to at least some example embodiments of the inventive concepts may be respectively applied to the application server and/or the storage server.

Referring to FIG. 14, the data center 1 may collect a variety of data and provide service and may be referred to as a data storage center. For example, the data center 1 may be a system for operations of a search engine and a database and may be a computing system used by companies such as banks or government agencies. As illustrated in FIG. 14, the data center 1 may include application servers 50_1 to 50_n and storage servers 60_1 to 60_m (where, m and n each are an integer greater than 1). The number of application servers 50_1 to 50_n, that is, n, and the number of storage servers 60_1 to 60_m, that is, m, may vary according to embodiments, and m and n may differ from each other.

The application servers 50_1 to 50_n may include at least one of processors 51_1 to 51_n, memories 52_1 to 52_n, switches 53_1 to 53_n, network interface controllers (NICs) 54_1 to 54_n, and storage devices 55_1 to 55_n, respectively. The processors 52_1 to 51_n may control all operations of the application servers 50_1 to 50_n and may access the memories 52_1 to 52_n, thereby executing instructions and/or data loaded on the memories 52_1 to 52_n. As a non-limited example, the memories 52_1 to 52_n may each include Double Data Rate Synchronous DRAM (DDR SDRAM), High Bandwidth Memory (HBM), Hybrid Memory Cube (HMC), Dual In-line Memory Module (DIMM), Optane DIMM, or Non-Volatile DIMM (NVMDIMM).

According to an embodiment, the number of processors and the number of memories included in the application servers 50_1 to 50_n may vary. In some embodiments, the processors 51_1 to 51_n and the memories 52_1 to 52_n may provide process-memory pairs. In some embodiments, the number of processors 51_1 to 51_n may be different from the number of memories 52_1 to 52_n. The processors 51_1 to 51_n may each include a single core processor or a multicore processor. In some embodiments, as indicated by dashed lines in FIG. 13, the storage devices 55_1 to 55_n may be omitted from the application servers 50_1 to 50_n. The number of storage devices 55_1 to 55_n included in the storage servers 50_1 to 50_n may be variously selected according to embodiments. The processors 51_1 to 51_n, the memories 52_1 to 52_n, the switches 53_1 to 53_n, the NICs 54_1 to 54_n, and/or the storage devices 55_1 to 55_n may perform intercommunications through the links described with reference to the drawings.

The storage servers 60_1 to 60_m may include at least one of processors 61_1 to 61_m, memories 62_1 to 62_m, switches 63_1 to 63_m, NICs 64_1 to 64_m, and storage devices 65_1 to 65_m. The processor 61_1 to 61_m and the memories 62_1 to 62_m may operate similarly to the processors 51_1 to 51_n and the memories 52_1 to 52_n of the application servers 50_1 to 50_n. The storage devices 65_1 to 65_m may be the storage device described with reference to FIGS. 1 to 8B.

The application servers 50_1 to 50_n and the storage servers 60_1 to 60_m may perform intercommunication through a network 70. In some embodiments, the network 70 may be realized by using a Fiber Channel (FC), Ethernet, or the like. The FC may be a medium used for data transmission having a relatively high speed and may be an optical switch providing high performance/high availability. According to an access method of the network 70, the storage servers 60_1 to 60_m may be provided as a file storage, a block storage, or an object storage.

In some embodiments, the network 70 may be a storage-specific network such as a Storage Area Network (SAN). For example, the SAN may be an FC-SAN using an FC network and realized according to FC protocols (FCP). Alternatively, the SAN may be an IP-SAN using a TCP/IP network and realized according to SCSI over TCP/IP or Internet SCSI (iSCSI) protocols. In some embodiments, the network 70 may be a general network such as a TCP/IP network. For example, the network 70 may be realized according to protocols such as FC over Ethernet (FCoE), Network Attached Storage (NAS), or NVMe over Fabrics (NVMe-oF).

Hereinafter, the application server 50_1 and the storage server 60_1 are mainly described. The descriptions regarding the application server 50_1 may be applied to another application server (e.g., the application server 50_n), and the descriptions regarding the storage server 60_1 may be applied to another storage server (e.g., the storage server 60_m).

The application server 50_1 m may store data, which the user or a client requests to store, in one of the storage servers 60_1 to 60_m through the network 70. Also, the application server 50_1 may obtain the data, which the user or the client requests to read, from one of the storage servers 60_1 to 60_m through the network 70. For example, the application server 50_1 may be realized as a web server, a Database Management System (DBMS), or the like.

The application server 50_1 may access the memory 52_n and/or the storage device 55_n included in another application server 50_n through the network 70, and/or may access the memories 62_1 to 62_m and/or the storage devices 65_1 to 65_m included in the storage servers 60_1 to 60_m through the network 70. Accordingly, the application server 50_1 may perform various operations on the data stored in the application servers 50_1 to 50_n and/or the storage servers 60_1 to 60_m. For example, the application server 50_1 may execute instructions for moving or copying the data between the application servers 50_1 to 50_n and/or the storage servers 60_1 to 60_m. According to at least some example embodiments of the inventive concepts, the data may be moved from the storage devices 65_1 to 65_m of the storage servers 60_1 to 60_m to the memories 52_1 to 52_n of the application servers 50_1 to 50_n directly or through the memories 62_1 to 62_m. In some embodiments, the data moved through the network 70 may be data encrypted for security or privacy.

In the storage server 60_1, the interface IF may provide a physical connection between the processor 61_1 and the controller CTRL and a physical connection between the NIC 64_1 and the controller CTRL. For example, the interface IF may be realized in a Direct Attached Storage (DAS) method for directly accessing the storage device 65_1 by using a dedicated cable. Also, for example, the interface IF may be realized in various interface methods such as ATA, SATA, e-SATA, SCSI, SAS, PCI, PCIe, NVMe, IEEE1394, USB, an SD card, an MMC, an eMMC, UFS, eUFS, a CF card interface.

In the storage server 60_1, the switch 63_1 may selectively connect the processor 61_1 and the storage device 65_1 according to the control of the processor 61_1 or may selectively connect the NIC 64_1 to the storage device 65_1.

In some embodiments, the NIC 64_1 may include a network interface card, a network adaptor, or the like. The NIC 54_1 may be connected to the network 70 by a wired interface, a wireless interface, a Bluetooth interface, an optical interface, or the like. The NIC 54_1 may include an internal memory, a DSP, a host bus interface, or the like and may be connected to the processor 61_1, the switch 63_1, and/or the like through the host bus interface. In some embodiments, the NIC 64_1 may be integrated with at least one of the processor 61_1, the switch 63_1, and the storage device 65_1.

In the application servers 50_1 to 50_n or the storage servers 60_1 to 60_m, the processors 51_1 to 51_m and 61_1 to 61_n may transmit commands to the storage devices 55_1 to 55_n and 65_1 to 65_m or the memories 52_1 to 52_n and 62_1 to 62_m to program or read the data. According to at least some example embodiments of the inventive concepts, the data may be data of which errors are corrected through the ECC engine. The data may be data on which Data Bus Inversion (DBI) or Data Masking (DM) is performed and may include Cyclic Redundancy Code (CRC) information. The data may be encrypted for security of privacy.

The storage devices 55_1 to 55_n and 65_1 to 65_m may transmit control signals and command/address signals to the non-volatile memory device NVM (e.g., a NAND flash memory device), in response to the read command received from the processors 51_1 to 51_m and 61_1 to 61_n. Accordingly, when the data is read from the non-volatile memory device NVM, the read enable signal is input as a data output control signal and is used to output the data as a DQ bus. A data strobe signal may be generated using the read enable signal. The command and the address signal may be latched according to an ascending edge or a descending edge of the write enable signal.

The controller CTRL may control all operations of the storage device 65_1. In an embodiment, the controller CTRL may include Static Random Access Memory (SRAM). The controller CTRL may write the data on the non-volatile memory device NVM in response to the write command or may read the data from the non-volatile memory device NVM in response to the read command. For example, the write command and/or the read command may be generated in response to requests provided from the host, e.g., the processor 61_1 in the storage server 60_1, the processor 61_m in another storage server 60_m, or the processors 51_1 to 51_n in the application servers 50_1 to 50_n. The buffer BUF may temporarily store (buffer) the data to be written on the non-volatile memory device NVM or the data read therefrom. In some embodiments, the buffer BUF may include DRAM. Also, the buffer BUF may store metadata, and the metadata may denote user data or data generated by the controller CTRL to manage the non-volatile memory device NVM. The storage device 65_1 may include a Secure Element (SE) for security or privacy.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A storage device comprising:
   a memory die;
   a storage controller processor configured to control an operation performed in the memory die by scheduling a plurality of commands provided to the memory die; and
   memory storing a command queue corresponding to the memory die,
   wherein the storage controller processor is configured to,
      receive the plurality of commands respectively from a first tenant and a second tenant;
      schedule the plurality of commands in the command queue, according to the first and second tenants providing the plurality of commands; and
      reschedule the plurality of commands according to the operation performed in the memory die and urgency of the plurality of commands assigned respectively to the plurality of commands by a respective corresponding tenant of the first tenant or the second tenant, and control the memory die to process the plurality of commands in an order different from an order in which the plurality of commands were received by the storage controller processor.

2. The storage device of claim 1,
   wherein the storage controller processor is further configured to classify each of commands from among the plurality of commands as a normal command or an urgent command, according to the urgency of the plurality of commands, the urgent command being a command that has a higher priority than the normal command, and
   wherein the command queue comprises an urgent command queue, in which the urgent command is enqueued, and a normal command queue, in which the normal command is enqueued.

3. The storage device of claim 2, wherein the storage controller processor is further configured to reschedule the plurality of commands while a normal read operation according to a normal read command is performed in the memory die.

4. The storage device of claim 2, wherein the storage controller processor is further configured to,
reschedule the plurality of commands by changing a process order position of an urgent read command in the plurality of commands to first, and
transmit, to the memory die, the urgent read command the process order position of which was changed.

5. The storage device of claim 4, wherein the storage controller processor is further configured to suspend the operation being performed in the memory die in response to receiving the urgent read command.

6. The storage device of claim 1, wherein the storage controller processor is further configured to,
receive a first command and a second command from the first tenant and receive a third command from the second tenant; and
schedule the first to third commands to be processed in the memory die in an order of:
the first command, the third command, and the second command.

7. The storage device of claim 6, wherein the storage controller processor is configured to receive the third command from the second tenant after sequentially receiving the first command and the second command from the first tenant.

8. A storage device comprising:
a plurality of memory dies;
a storage controller processor configured to schedule a plurality of commands provided to the plurality of memory dies and control operations performed in the plurality of memory dies; and
memory storing a plurality of command queues respectively corresponding to the plurality of memory dies,
wherein the storage controller processor is further configured to,
schedule the plurality of commands in the plurality of command queues, according to a plurality of tenants configured to respectively provide the plurality of commands, and urgency of the plurality of commands assigned respectively to the plurality of commands by a respective corresponding tenant of the plurality of tenants, and
reschedule the plurality of commands according to an operation performed in a memory die to which at least some of the plurality of commands are provided.

9. The storage device of claim 8, wherein the storage controller processor is further configured to classify each of commands from among the plurality of commands as a normal command or an urgent command, according to the urgency of the plurality of commands, the urgent command being a command that has a higher priority than the normal command.

10. The storage device of claim 9, wherein each of the plurality of command queues includes an urgent command queue, in which urgent commands are enqueued, and a normal command queue, in which normal commands are enqueued.

11. The storage device of claim 9, wherein the storage controller processor is further configured to reschedule the plurality of commands while a normal read operation according to a normal read command is performed in a memory die to which at least some of the plurality of commands are provided.

12. The storage device of claim 9, wherein the storage controller processor is further configured to,
reschedule the plurality of commands by changing a process order position of an urgent read command, from among the plurality of commands, to first, and
transmit the urgent read command, the process order position of which was changed, to a corresponding memory die from among the plurality of memory dies.

13. The storage device of claim 12, wherein the storage controller processor is further configured to,
suspend the operation being performed in the corresponding memory die in response to receiving the urgent read command, and
process the received urgent read command.

14. An operation method of a storage device, the storage device including a storage controller processor and a plurality of memory dies, the operation method comprising:
receiving a plurality of commands from a plurality of tenants;
scheduling the plurality of commands in a Round-Robin manner, according to the plurality of tenants;
scheduling the plurality of commands according to urgency of the plurality of commands assigned respectively to the plurality of commands by a respective corresponding tenant of the plurality of tenants, respectively; and
rescheduling the plurality of commands according to an operation performed in a memory die to which at least some of the plurality of commands are provided.

15. The operation method of claim 14, wherein the receiving of the plurality of commands comprises:
classifying each of commands from among the plurality of commands as a normal command or an urgent command according to urgency of each of the plurality of commands, the urgent command being a command having a higher priority than the normal command.

16. The operation method of claim 15, wherein the rescheduling of the plurality of commands comprises:
rescheduling the plurality of commands while a normal program operation according to a normal program command is performed in a memory die to which each of the plurality of commands is provided.

17. The operation method of claim 15, wherein the rescheduling of the plurality of commands comprises:
changing a process order position of an urgent read command in the plurality of commands.

18. The operation method of claim 17, wherein the changing of the process order of the urgent read command comprises:
changing the process order position of the urgent read command to a first and transmitting the urgent read command to a corresponding memory die.

19. The operation method of claim 18, further comprising:
after the transmitting of the urgent read command to the corresponding memory die, suspending an operation being performed in the corresponding memory die, and performing an operation according to the urgent read command in the corresponding memory die.

20. The operation method of claim 17, wherein the changing of the process order of the urgent read command comprises:
in response to a number of times that the process order position of the urgent read command is changed being less than a reference value, changing the process order position of the urgent read command to first and updating the number of times.

* * * * *